US011209863B2

(12) United States Patent
Delaporte

(10) Patent No.: US 11,209,863 B2
(45) Date of Patent: Dec. 28, 2021

(54) MAGNETIC CONFIGURATIONS FOR FLEXIBLE DISPLAY COMPUTING DEVICES

(71) Applicant: Lepton Computing LLC, Astoria, NY (US)

(72) Inventor: Stephen E. Delaporte, New York, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 0 days.

(21) Appl. No.: 16/578,123

(22) Filed: Sep. 20, 2019

(65) Prior Publication Data

US 2020/0117237 A1 Apr. 16, 2020

Related U.S. Application Data

(63) Continuation of application No. 16/237,484, filed on Dec. 31, 2018, which is a continuation of application (Continued)

(51) Int. Cl.
*G06F 1/16* (2006.01)

(52) U.S. Cl.
CPC .......... *G06F 1/1641* (2013.01); *G06F 1/1616* (2013.01); *G06F 1/1643* (2013.01); *G06F 1/1679* (2013.01)

(58) Field of Classification Search
CPC .... G06F 1/1641; G06F 1/1643; G06F 1/1616; G06F 1/1679
See application file for complete search history.

(56) References Cited

U.S. PATENT DOCUMENTS 7,095,387 B2   8/2006   Lee et al.
D600,233 S     9/2009   Birsel et al.
(Continued)

FOREIGN PATENT DOCUMENTS

GB    2 436 039        9/2007
KR    20080035709      4/2008

OTHER PUBLICATIONS

International Search Report and Written Opinion dated Jan. 17, 2012 for International Application No. PCT/US2011/047095, filed.
(Continued)

*Primary Examiner* — Kenneth B Lee, Jr.
(74) *Attorney, Agent, or Firm* — Sheppard, Mullin, Richter & Hampton LLP

(57) ABSTRACT

Reconfigurable touch screen computing devices with folding configurations that include flexible and/or rigid displays made up of segments reconfigured from a compact state to an expanded state are described. The form factor of the compact state is the size of a handheld phone (including an integrated speaker and microphone). The form factor of the expanded state is the size of a tablet computer (including the mechanical functionality of a laptop). Both states provide a configuration including a touch screen display on a front side and a protective housing on a back side. The computing devices include sensors indicating the state and mechanisms for folding, alignment, and structural support, and magnets for the devices to be locked in the folded or unfolded state. A module attached to at least one segment may contain substantially all processing and memory, and a communications system, all which may be used in either state.

37 Claims, 22 Drawing Sheets

Related U.S. Application Data

No. 13/206,333, filed on Aug. 9, 2011, now Pat. No. 10,234,902.

(60) Provisional application No. 61/372,391, filed on Aug. 10, 2010.

(56) References Cited

U.S. PATENT DOCUMENTS

| | | | |
|---|---|---|---|
| 7,714,801 | B2 | 5/2010 | Kimmel |
| 2003/0071832 | A1 | 8/2003 | Branson |
| 2005/0099361 | A1 | 5/2005 | Majer |
| 2007/0191070 | A1 | 8/2007 | Rao |
| 2007/0279315 | A1 | 12/2007 | Laves |
| 2008/0068288 | A1 | 3/2008 | Henkel |
| 2008/0238813 | A1 | 10/2008 | Gettemy et al. |
| 2009/0061960 | A1* | 3/2009 | Chang ............... H04M 1/0218 455/575.3 |
| 2010/0058205 | A1 | 3/2010 | Vakil et al. |
| 2010/0064244 | A1* | 3/2010 | Kilpatrick, II ........ G06F 1/1649 715/773 |
| 2010/0172074 | A1 | 7/2010 | Kumagai et al. |
| 2012/0133592 | A1 | 5/2012 | Kim |

OTHER PUBLICATIONS

Non-final Office Action dated May 18, 2020 for U.S. Appl. No. 16/237,484, filed Dec. 31, 2018.
Non-final Office Action dated May 18, 2020 for U.S. Appl. No. 16/578,153, filed Sep. 20, 2019.
Non-final Office Action dated May 19, 2020 for U.S. Appl. No. 16/578,172, filed Sep. 20, 2019.
Non-final Office Action dated May 20, 2020 for U.S. Appl. No. 16/578,146, filed Sep. 20, 2019.
Non-final Office Action dated May 21, 2020 for U.S. Appl. No. 16/578,164, filed Sep. 20, 2019.
Non-Final Office Action dated May 15, 2019 for U.S. Appl. No. 16/237,484, filed Dec. 31, 2018.
Final Office Action dated Nov. 8, 2019 for U.S. Appl. No. 16/237,484, filed Dec. 31, 2018.
Non-Final Office Action dated May 20, 2019 for U.S. Appl. No. 16/280,009, filed Feb. 19, 2019.
Non-Final Office Action dated Apr. 2, 2020 for U.S. Appl. No. 16/280,009, filed Feb. 19, 2019.
International Search Report dated Apr. 20, 2020 for International Application No. PCT/US2020/018864, filed Feb. 19, 2020.
Non-final Office Action dated May 21, 2019 for U.S. Appl. No. 16/289,547, filed Feb. 28, 2019.
Non-final Office Action dated Mar. 30, 2020 for U.S. Appl. No. 16/289,547, filed Feb. 28, 2019.
Non-final Office Action dated Jan. 12, 2021 for U.S. Appl. No. 16/280,009, filed Feb. 19, 2019.
Non-final Office Action dated Jan. 13, 2021 for U.S. Appl. No. 16/289,547, filed Feb. 28, 2019.

* cited by examiner

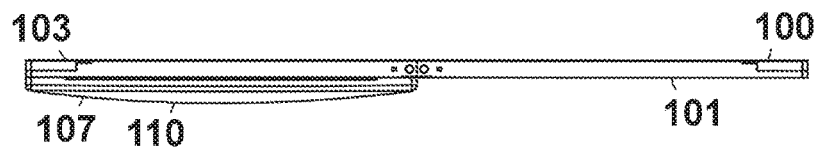
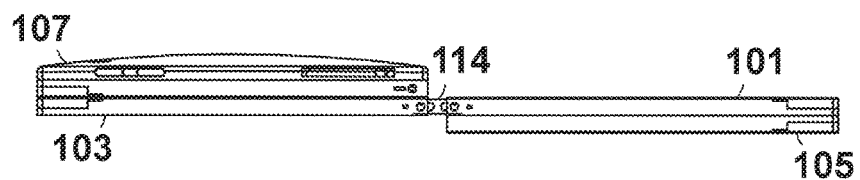
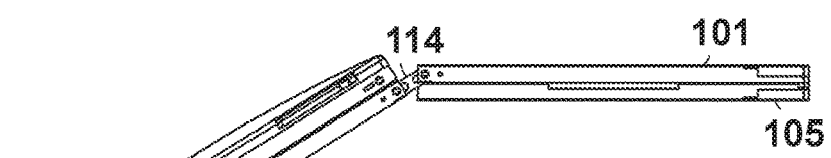
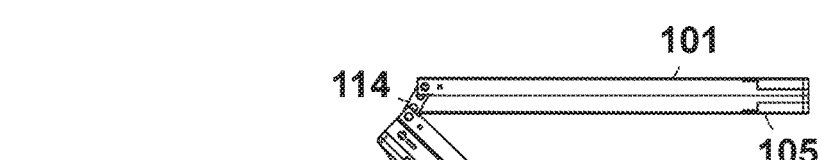
FIG. 11
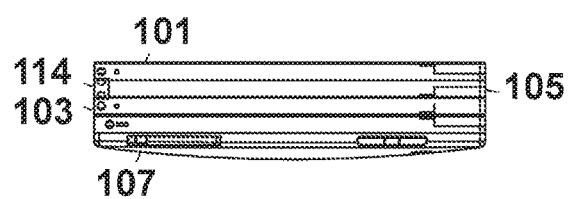

MAGNETIC CONFIGURATIONS FOR FLEXIBLE DISPLAY COMPUTING DEVICES

CROSS REFERENCE TO RELATED APPLICATIONS

This application is a continuation of U.S. patent application Ser. No. 16/237,484, filed Dec. 31, 2018, which is a continuation of U.S. patent application Ser. No. 13/206,333, filed Aug. 9, 2011, which claims the benefit of U.S. Provisional Patent Application No. 61/372,391, filed on Aug. 10, 2010. The specifications of which are incorporated in their entirety herein by reference.

FIELD OF THE INVENTION

The present invention relates generally to computing devices, and more particularly, to a computing device with a touch screen display that can be reconfigured from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small scale touch screen device, however, is in the fact that it can often be cumbersome to physically interact with. This is especially apparent when selecting and manipulating features and inputting text, which can sometimes be imprecise for a user. Additionally, in such handheld computing devices as a touch screen mobile phone, the limited size of the display can significantly reduce the viewing capacity of graphic-intensive applications, watching videos, and reading text.

There is therefore a need for touch screen displays having increased size without sacrificing the convenience of a small device.

SUMMARY OF EMBODIMENTS OF THE INVENTION

To mitigate the difficulties associated with a small scale touch screen, variations on flexible displays and the implementation of multiple screen displays have been proposed to enable the transformation of a display from a compact state to an expanded state. Although the use of flexible displays and multiple screen displays offer the advantages of a transformation in scale, there are still a number of limitations to how they can be implemented. For example, since a flexible display has a radius when folded, it is difficult to configure multiple segments into a completely flat and compact position. If a flexible display is to be used as a touch screen, a reconfigurable structure and an alignment locking mechanism would be advantageous if integrated as a support system. An optimized flexible circuit and folding configuration would also be beneficial to increase a display's expansion ratio from a compact state to a fully deployed state for both flexible and multiple screen displays, especially if expanded out to a full scale tablet or laptop form factor.

There is a need for a computing device that can retain the form factor and functionality of a phone, while also providing a touch screen display that can be reconfigured from a compact state to an expanded state, with an optimized expansion ratio and folding configuration. Furthermore, there is a need for a graphical user interface that facilitates the transition of content from one state to another. Such an interface would ultimately facilitate a user's physical interaction with a computing device and provide the option of rescaling and viewing content on both a small scale display and a large scale display.

A reconfigurable touch screen computing device with folding configurations is disclosed. The touch screen display may be made up of segments coupled to a flexible circuit and can be reconfigured from a compact state to an expanded state. The form factor of the compact state may be roughly the size of a typical handheld phone, optionally with an integrated speaker and microphone. The form factor of the expanded state may be roughly the size of a tablet computer, which may also include the mechanical functionality of a laptop. According to some embodiments of the invention, both states may provide a configuration that includes a touch screen display on a front side and a protective housing on a back side. The computing device may further include sensors that indicate to a processor the state of configuration.

According to embodiments of the invention, a graphical user interface method is also provided to facilitate the transition of content from one screen state to another. A module situated within at least one segment may contain all processing and memory, along with a communications system, which can be used in both states.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 11 is a diagram of a folding sequence showing a frame hinge in accordance with one embodiment of the invention;

Figure 1A:
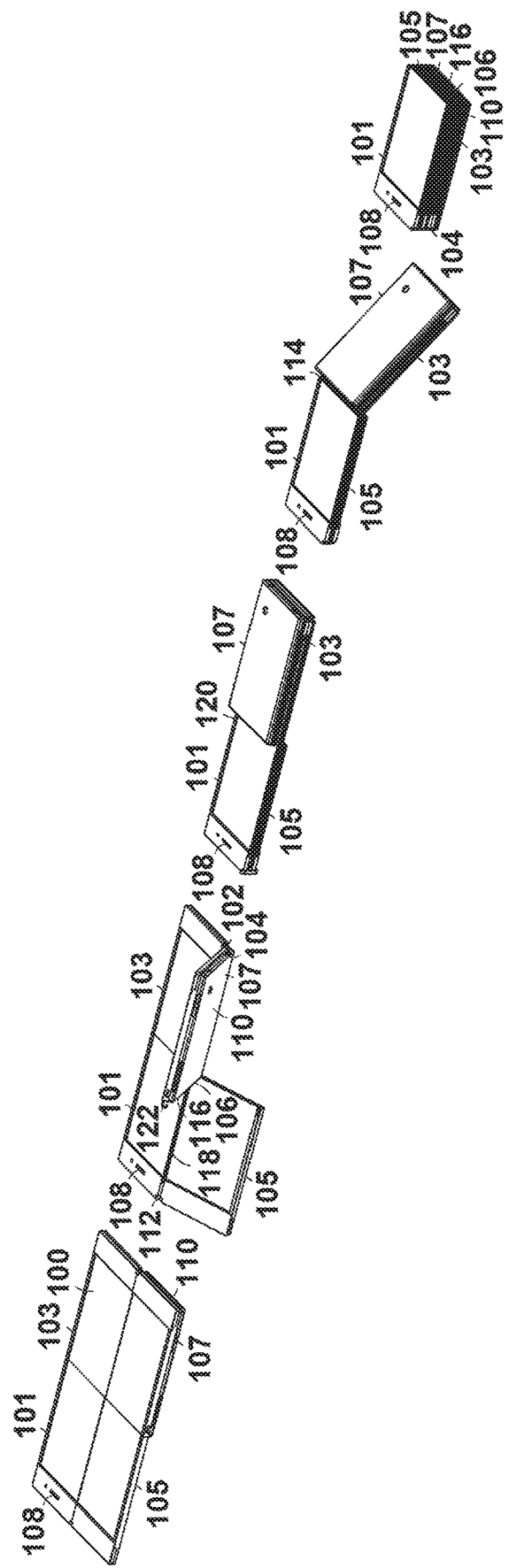
FIG. 1a is an exploded view of one embodiment of a foldable computing device configured with a flexible touch screen display having four segments and a single rigid touch screen display.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In accordance with the exemplary embodiment shown in FIG. 1a, a computing device 100 is shown with a reconfigurable touch screen display. The diagram of FIG. 1a further illustrates a folding sequence for the computing device 100 having four touch screen display segments which are shown in five different positions. Each position illustrates the rotation of a segment or set of segments along different axes, such that the entire display can be reconfigured from an open state, shown in the first position at the left side of the sequence, to a compact state, shown in the fifth position at the right side of the sequence. Both the open state and the compact state provide a back side with a protective housing, and a front side with a touch screen display. The open state position, shown in the first position on the left side of the folding sequence, illustrates a touch screen display made up of segments 101, 103, 105, and 107, which ultimately provides the general aspect ratio and dimensions of a tablet form factor. The closed state, alternatively, provides the functionality, general aspect ratio and dimensions of a phone with a slate form factor, which ultimately integrates a speaker 108 and a microphone 106. Each display segment also has a rectangular shape based off of the general aspect ratio of a phone with a slate form factor, which can vary anywhere from 3:2 to 21:9. A screen with a 4.3" length and a resolution of 854×480, which has an aspect ratio of 16:9, is also an ideal screen size for each segment.

In addition to the touch screen display segments from the exemplary embodiment shown m FIG. 1a, a computing module 110 which contains some or substantially all processing, peripheral ports, communications circuitry, battery and additional core electronics, may be coupled to segment 107. It will be recognized the additional electronics can also be housed in other segments, such as additional batteries and sensors. Microphone 106 may also be situated on an outside edge 116 of computing module 110, which can be seen located on the under middle side of the tablet state as it transitions in the second position. In the fifth position of the folding sequence, microphone 106 can also be seen on the same outside edge 116 of computing module 110, but in a functional position for the phone state, since it ends up with a location on the opposite side of speaker 108. A push button, which is used for switching the screen output from the tablet state configuration to the phone state configuration, and a headphone jack are situated on outside edge 104 of segment 107, which can also be seen in the second position from the left in the folding sequence. Having computing module 110 located in the lower right corner of the entire screen configuration coupled to segment 107, ultimately allows all four segments to fold in such a way that they can be positioned with access to the push button and the headphone jack along outside edge 104 while in both an open position and a compact position. This configuration also allows for a smooth transition without any interference between the large size of the housing for computing module 110 and all other segments during folding. Similarly, an external port can be accessed along outside edge 116 from underneath computing device 100 when it is in a tablet state, and then again along the side of computing device 100 when it is in a phone state, which can be seen in the fifth position from the folding sequence in FIG. 1a.

To elaborate on the specifics of the folding sequence shown in FIG. 1a, a description of each segment's axis and direction of rotation will be explained with further detail. It is important to recognize that each segment has a front side having a touch screen display and a back side having a protective housing. In the first position of computing device 100, shown on the left side of the folding sequence diagram, all four touch screen display segments are positioned in an open tablet state. In the second position of the folding sequence diagram, two folds are illustrated. The first fold is made up of segment 105 which is attached to segment 101 and is rotated downward along axis 118 with frame hinge 112, such that both segments and their back faces will be tangent with each other when fully rotated. The second fold illustrated in the second position of the folding sequence diagram from FIG. 1a, is made up of segment 107 which is attached to segment 103 and rotated upward, in the reverse direction of segment 105, along axis 118 with frame hinge 102. The result of these rotations can be seen in the third position from the left of the folding sequence diagram where segment 105 ends up being situated underneath segment 101, while segment 107 ends up being situated above segment 103. Because of the opposing directions that both halves of the initial configuration rotate in to achieve a back side with a protective housing and a front side with a touch screen display in the final configuration, an "asymmetrical folding" pattern is implemented. This same concept is also applied for other embodiments of the invention, which will be discussed in more detail for FIGS. 1b and 2. Another crucial feature that is shown in the second position of the folding diagram in FIG. 1a is latch 122. Latch 122 is essentially an element that allows segment 107 to attach with segment 105 and consists of a hook situated along the frame edge of segment 107, which can manually or automatically engage with a pin on the frame edge of segment 105. For connections that are manually locked, a sliding or rotational mechanism can be accessed by a user along the same edge as latch 122 to lock or unlock the connection. Latch 122 from segment 107 may also attach with the frame edge of segment 105 through magnetic means, or through the use of a variety of other kinds of mechanisms as well. Along the broader frame edges for each segment, which can be seen initially on the left and right sides in the first position of computing device 100 in FIG. 1a, magnets may also be housed to provide a means for connecting and aligning each of the segments as they are folded flat against each other to transition to the phone state. To elaborate further on the folding sequence, in the fourth position of the diagram, segments 107 and 103 are then rotated downward along axis 120 with frame hinge 114, such that the back face of segment 103 ends up in a position that is tangent with the front face of segment 105. In the fifth and final position of the folding sequence, the phone state is shown where the back side of computing module 110 is situated on the underside of the phone configuration, while segment 101 with speaker 108 is situated on the top side of the phone configuration. Although it is ideal to have computing module 110 located on the underside of the final configuration, especially because of the use and integration of a camera in this final position, computing module 110, with all its associated peripheral ports and features, may also be integrated with any other segment of computing device 100.

Figure 1B:
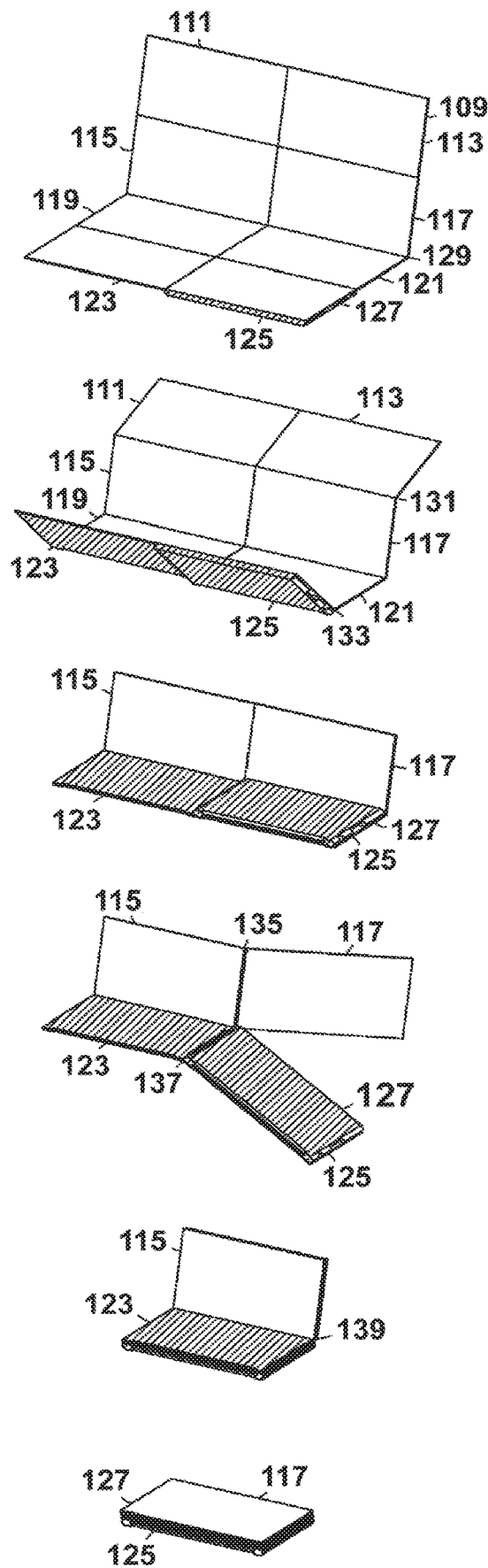
FIG. 1b is an exploded view of one embodiment of a foldable computing device configured with a flexible touch screen display having two segments and a single rigid touch screen display.

In accordance with the exemplary embodiment shown in FIG. 1b, a computing device 109 is shown with a reconfigurable touch screen display. The diagram of FIG. 1b further illustrates a folding sequence for the computing device 109 having eight touch screen display segments which are shown in six different positions. Each position illustrates the rotation of a set of segments along different axes, such that the entire display can be reconfigured from an open state, shown in the first position at the top of the sequence, to a compact state, shown in the sixth position at the bottom of the sequence. Both the open state and the compact state provide a back side with a protective housing, and a front side with a touch screen display. The open state position at the top of the folding sequence shows two primary areas of touch screen display segments, one half being made up of segments 111, 113, 115, and 117, and the other half being made up of segments 119, 121, 123, and 125. Both of these segment areas can be rotated about a central axis 129 through a mechanical hinge located between segments 115 and 119, which ultimately provides the mechanical functionality, general aspect ratio and dimensions of a small laptop form factor, which can also be folded flat into a tablet. The closed state, alternatively, provides the functionality, general aspect ratio and dimensions of a phone with a slate form factor. Similar to what was indicated for computing device 100 in FIG. 1a, each display segment from computing device 109 in FIG. 1b also has a rectangular shape based off of the general aspect ratio of a phone with a slate form factor. A display with a 4.3" length and a resolution of 854×480, which has an aspect ratio of 16:9, is also an ideal screen size for each segment.

In addition to the touch screen display segments from the exemplary embodiment shown m FIG. 1b, a computing module 127 which contains all processing, peripheral ports, communications circuitry, a battery and all additional core electronics, is also coupled to segment 125. As mentioned with FIG. 1a, additional electronics may also be housed in other segments, such as additional batteries and sensors for computing device 109. Having the computing module 127 located in the lower corner of the entire screen configuration coupled to segment 125, ultimately allows all eight segments to fold in such a way that they can be positioned with access to the peripheral ports located on the edges of computing module 127, while in both an open position and a compact position. This configuration also allows for a smooth transition without any interference between the large size of the housing for the computing module 127 and all other segments during folding.

To elaborate on the specifics of the folding sequence shown in FIG. 1b, a detailed description of each segment's axis and direction of rotation will be further explained. It is important to recognize that each segment has a front side having a touch screen display and a back side having a protective housing. Computing device 109 also implements an asymmetrical folding pattern, similar to what was illustrated in FIG. 1a. The primary difference between the two sequences is in the fact that the sequence shown in FIG. 1b is for a computing device which uses eight segments, whereby one half of the device, which includes four segments, folds in one direction, while the other half, which also includes four segments, folds in the opposite direction. This may be further understood through a description of each individual position illustrated. In the first position of computing device 109, shown at the top of the folding sequence diagram, all eight touch screen display segments are positioned in an open laptop state, where axis 129 allows the top four segments to be rotated down to a closed laptop state, or fully rotated back, providing a tablet state. In the second position from the top of the folding sequence diagram, two folds are illustrated. The first fold is made up of segments 111 and 113 which are attached to segments 115 and 117 and rotated along axis 113, such that both sets of segments and their back faces will be tangent with each other when fully rotated. The result of this full rotation can be seen in the third position down from the top of the folding sequence diagram, where segments 115 and 117 and their touch screen displays are showing, while their back sides are touching the back sides of segments 111 and 113.

In the second position of the folding sequence shown in FIG. 1b, a second fold is also illustrated with segments 119 and 121 which are attached to segments 123 and 125 and are rotated along axis 133. This fold is rotated in the same direction that segments 111 and 113 are folded with segments 115 and 117, but with different results because of their contrasting position relative to the entire configuration. With segments sets 119, 121, and 123, 125, a full rotation instead positions each set with its touch screen display sides tangent with the touch screen display sides of the other. This can be seen in the third position of the folding sequence diagram where segments 123 and 125 are shown with their back sides facing up and their touch screen display sides facing down along the surface of the touch screen display sides of segments 119 and 121.

Additionally in FIG. 1b, a fourth position of computing device 109 is shown in the folding sequence diagram where two more folds are illustrated. These two folds contain two sets of segments which are the result of previous folds. The first fold is along axis 135, where set 117 and 113 are rotated back so that the front side of segment 113 ends up tangent with the front side of segment 111, which were both initially positioned behind segments 115 and segment 117 respectively. Similarly, the second fold illustrated in the fourth position of the folding sequence diagram illustrates segments 125 and 121 along axis 137 so that the back face of segment 121 is rotated to a position that places it tangent to the back side of segment 119, which sits below segment 123. The resulting position of the two folds from position four can be seen in position five of the folding sequence diagram where only two sets of segments are left to be folded. A crucial part of the folding sequence shown in FIG. 1 is the in fact that there is no physical connection between segments 121 and 117. This essentially allows two primary sets to be folded in the sequence so that only two segment sets need to be folded at any given fold. Once a fold has more than two segments, difficulties with the electronic connection, which is best implemented with a flexible circuit, can occur when two sets need to be physically displaced with the same distance that a set of pieces is repositioned to, between a fold. Having more than two sets of two segments makes a fold very difficult to achieve if electrical connections are to remain attached. An alternative to a displaced connection would be to have extra slack on a flexible circuit between each display segment. This is ideal with computing device 100 from FIG. 1a, because of the smaller number of segments it uses. In the final two positions of the folding sequence diagram, a last fold is illustrated along axis 129 where the top set of segments, 115, 111, 113, and 117 are rotated down in a position tangent with the bottom set of segments, 123, 119, 121, and 125, where the front side of segment 115 is positioned tangent to the back side of segment 123. A final position in the folding sequence which shows the computing device 109 in a compact state with the form factor of a phone has a front face which is the front side of segment 117, and a back side, which is the back side of segment 125. Having segment 125 on the bottom ultimately allows the computing module 127 to be positioned as the back side of the computing device 109 in its compact state.

Figure 2:
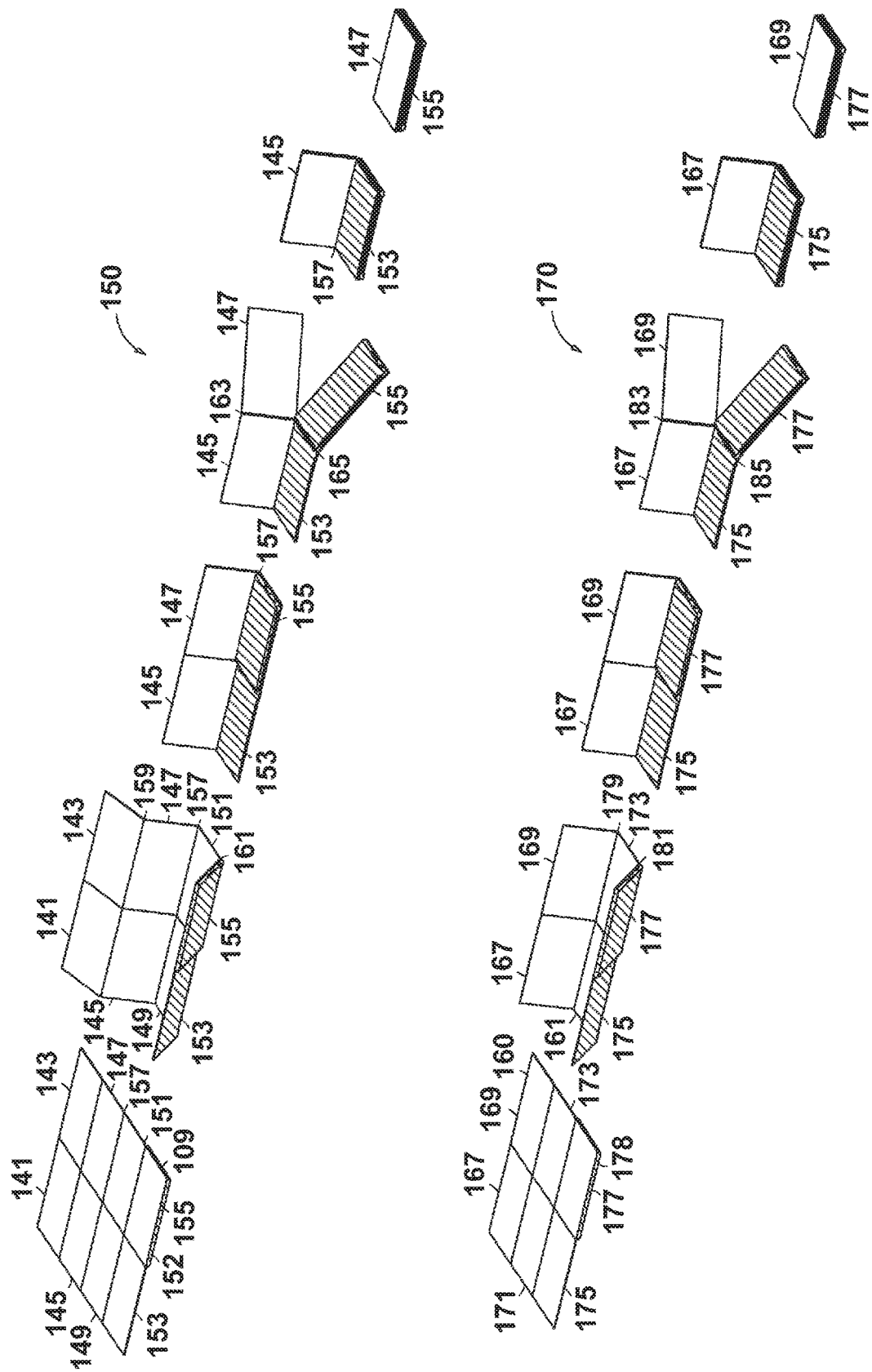
FIG. 2 is a diagram of a folding sequence for one embodiment of a touch screen display configuration for a computing device.

Referring to FIG. 2, two folding sequences for two separate embodiments of the disclosed invention are provided. The first folding sequence 150 shows the same sequence and computing device 109 shown in FIG. 1 but is illustrated above a second folding sequence 170 with a computing device 160 to show the similarities between both folding patterns. The primary difference between the computing device 109 and computing device 160 is in the fact that the computing device 160 has six segments instead of eight. Because the folding logic in the first folding sequence 150 provides a transformation where the computing module 152, which is coupled to segment 155, does not interfere with any other segments, it is ideal to apply a similar method of transformation for any configuration with fewer number segments where at least one segment is connected on three sides with additional segments. Since segment 147 ends up as the front face of the touch screen display for the compact state and segment 155 and the computing module 152 ends up as the back side of the compact state in the sixth position in the first folding sequence 150, applying the same axes and folding rotations to computing device 160 and the second folding sequence 170 provides a similar optimization in its transition from an open state to a compact state as well. This can be seen with segment 169 and segment 177 in the second folding sequence, where segment 169 is repositioned from the top right corner of the computing device 160, shown in the first position at the left side of the sequence, to the top of the computing device 160, shown in the sixth position at the right side of the sequence.

When comparing each position of both folding sequences shown in FIG. 2, segments 145 and 147, when folded from their third position to their fourth position along axis 163 include two sets of segments, 141 and 143, from a previous fold. In contrast, segments 167 and 169, from computing device 160, fold along axis 183 between the third position and the fourth position of the second folding sequence 170 as individual segments. The bottom half of segments in computing device 109, which include segments 149, 151, 153, and 155, have the same configuration and folding pattern when compared with segments 171, 173, 175, and 177 of computing device 160 shown in the second folding sequence 160.

Figure 3:
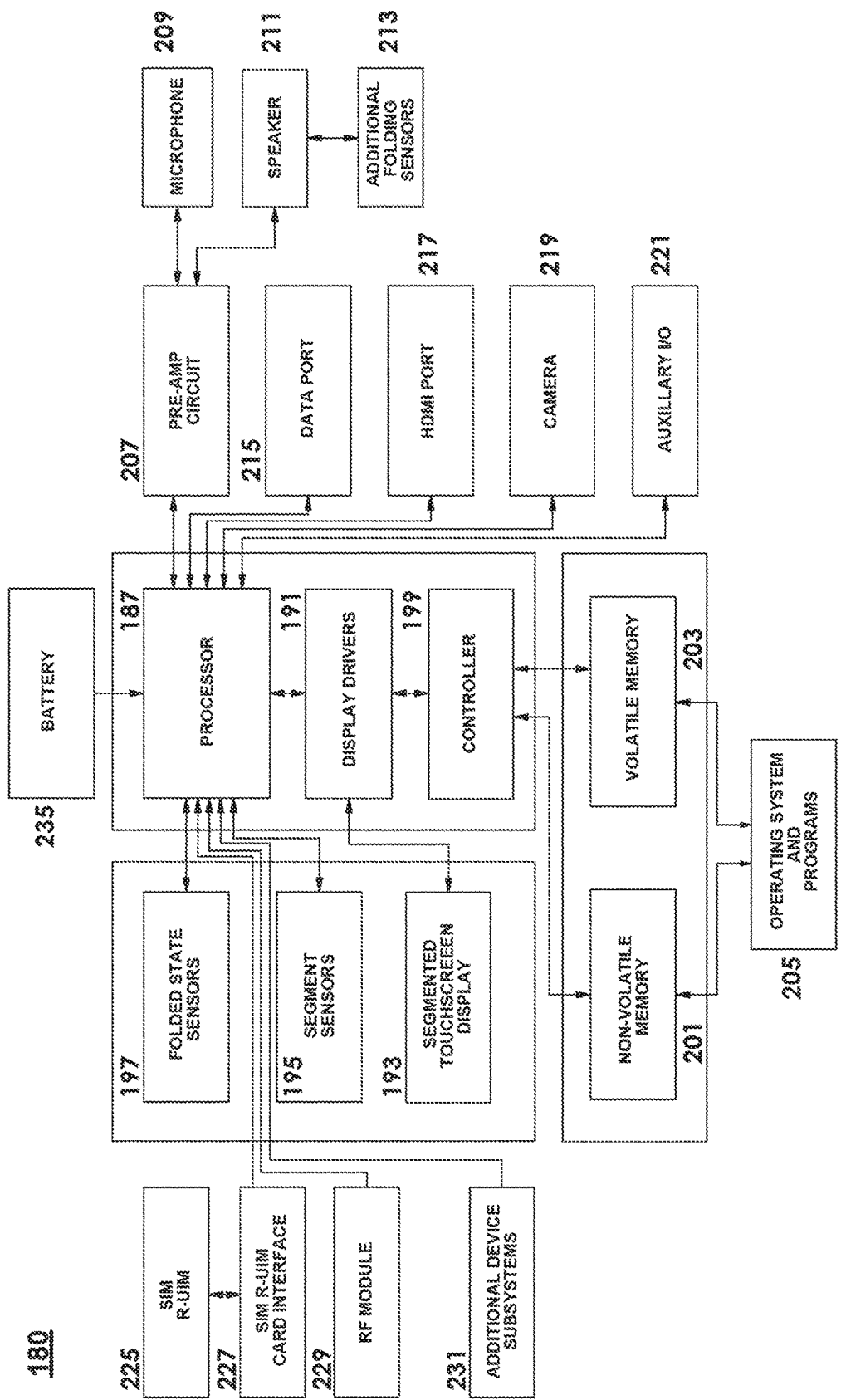
FIG. 3 is a block diagram showing the basic functions of a computing device in accordance with the present invention.

FIG. 3 shows a block diagram which illustrates the basic electronic hardware components for the present invention. The computing device 180 has a processor 187 which is coupled to several other components. Based upon the scope of functionality of the computing device 180, an optimal processor would include one from the Texas Instruments OMAP series, such as the OMAP 3530, OMAP 4430, or OMAP 4440. These processors, or system on chips (SOCs), are ideal because of their ability to run common operating systems and because of their integration of an ARM processor. They are also ideal because of their ability support a variety of different audio and video applications. The memory controller 199, which is also coupled to the processor 187, can control non-volatile memory 201 and volatile memory 203. The non-volatile memory may include a variety of different solid-state systems, including but not limited to flash memory and magnetic disc storage. An external hard disk drive may also be attached via the data port 217, which would optimize the memory for the computing device 180, because of its small scale.

The memory for the computing device 180 also includes stored software programs which consist of several different components. Most generally, an operating system component, i.e., Linux, UNIX, Android or Symbian, is stored to control other primary functions such as wireless communication, communication with external devices, power management, text input features such as e-mail, Internet browser, Global Positioning System (GPS), music and video players, along with a number of other additional features. The data port 215 acts as the primary connection for communicating with other devices through Universal Serial Bus (USB) or other similar and common communication means. Additionally, a High-Definition Multimedia Interface, or HDMI port 217, is included to provide a connection with other devices such as video projectors, digital audio systems, computer monitors, and other additional devices for optimizing audio and visual outputs.

Display drivers 191 are also included to control the segmented touch screen display. Controlling content on the display is important because of its constant transition from a single screen, when the segmented touch screen display 193 is in a compact state, to multiple segments, when the segmented touch screen display 193 is in an open, expanded state. Furthermore, to facilitate this transition, two sets of sensors are integrated into the computing device 180. The first set, called the segment sensors 195, are located on the edges of segments and control and activate the segmented touch screen display 193 when it is in a fully open state. The folded state sensors 197, which are located on the faces of segments, alternatively, control and activate the segmented touch screen display when it is in a folded, compact state, by rescaling any content to the single screen that is used as the face of the computing device 180, in its compact state. These sensors and the transition of content will be further discussed in later references to FIG. 4 and FIGS. 13-18.

For basic phone functionality, a pre-amp circuit 207, microphone 209 and speaker 211 are included. Additional folding sensors 213 are also integrated in one embodiment where the computing device 180 has a speaker that can rotate from a closed position at the back of the computing device 180, to an open and functional position along its front side. The speaker 211 can also be used with a higher amplitude when the computing device 180 is in an open laptop state. This feature will also be elaborated on in later references to FIGS. 17 and 18.

Additional features in the block diagram shown in FIG. 3, include a camera 219, a subscriber identity module (SIM) or removable user identity module (R-UIM) card 225 with a corresponding card interface 227, auxiliary i/o 221, which can include an audio jack and other possible ports, and additional device subsystems 231. The radio frequency or RF module 229 ultimately controls all wireless communication for both the internet and phone functionality. This includes but is not limited to communicating with networks, such as the World Wide Web (WWW), Wireless Local Area Network (WLAN), Wireless Personal Area Network (WPAN), standard cellular telephone networks, and so on. A number of communications standards and systems may also be used, including but not limited to Wireless Fidelity (WiFi), Bluetooth, Post Office Protocol (POP), along with a number of other standards and systems as well.

It is important to note that although a particular configuration of hardware and software components has been described for the block diagram shown in FIG. 3, these components and their configurations may also be arranged with additional components and in other combinations to achieve the same basic computing functions.

Figure 4:
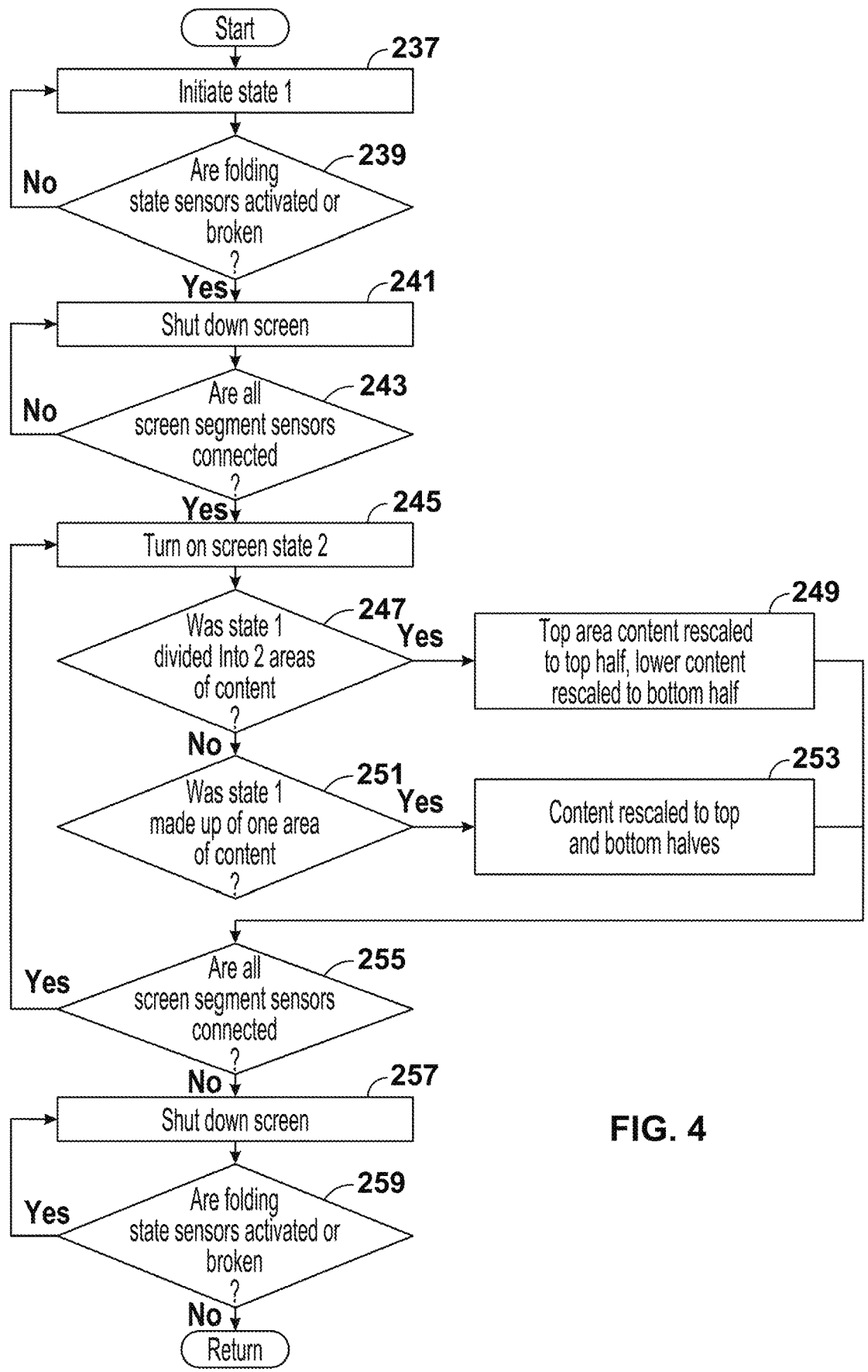
FIG. 4 is a flowchart showing the transition of content from a compact screen display to an expanded screen display in accordance with the invention.

Referring to FIG. 4, a flowchart illustrates one embodiment of a sequence of events for transitioning content on the reconfigurable touch screen display from a compact state to an expanded state. State 1, block 237, represents the reconfigurable touch screen computing device when it is in its compact state with content showing on the a single screen display. As the touch screen display is unfolded, a first determination 239 is made about whether or not the folding state sensors, which are located on the faces of the touch screen display, are broken from separating the screen segments, which will ultimately shut down all screen segments, block 241. Once the touch screen display has been fully opened, a second determination 243 is made about whether or not all segment sensors, which are located between the edges of the touch screen display segments, are connected. If they are connected, then the screen will turn on in state 2, block 245. If they are not connected, then the screen will remain off. A third determination 247 is then made based upon whether or not the screen from state 1, block 237, had two areas of content. If yes, then the top area of content is rescaled to the top four segments of the touch screen display, while the lower area of content is rescaled to the bottom four segments of the touch screen display, block 249. If that is not the case then a fourth determination 251 is made about rescaling the content from state 1. If there was one area of content, then the content is rescaled to all segments, block 253. When the screen is to be folded back to state 1, a fifth determination 255 is then made about whether or not all screen segment sensors are connected. If they are not connected due to folding, then the screen will shut down, block 257. If they are, then the content will remain present on the screen in state 2. A final determination 259 is then made about whether or not the folding state sensors are activated, which occurs when the segments faces are tangent with each other. If they are, then the entire sequence will return to state 1 where all content is rescaled back to the single screen display that acts as the face of the computing device's compact state.

As an alternative method to the features and sequence described in FIG. 4, both the sensors that lie between the edges of the segments and the sensors that lie on the faces of the segments, can simply perform the function of shutting the screen off when their connections are broken during a folding sequence. For turning the screen on in either state, a manually operated mechanical push button, membrane switch, force sensing resistor, or other form of manual electromechanical switching means may be used to turn the screen on. A first manual electromechanical switch may also be designated specifically for turning the touch screen display on in a compact state, while a second manual electromechanical switch may be used for turning the touch screen display on in an expanded state. These manual electromechanical switches can also be used to turn the screen off in either state, which would ultimately bypass the use of any previously defined sensors and their designated functions.

Figure 5:
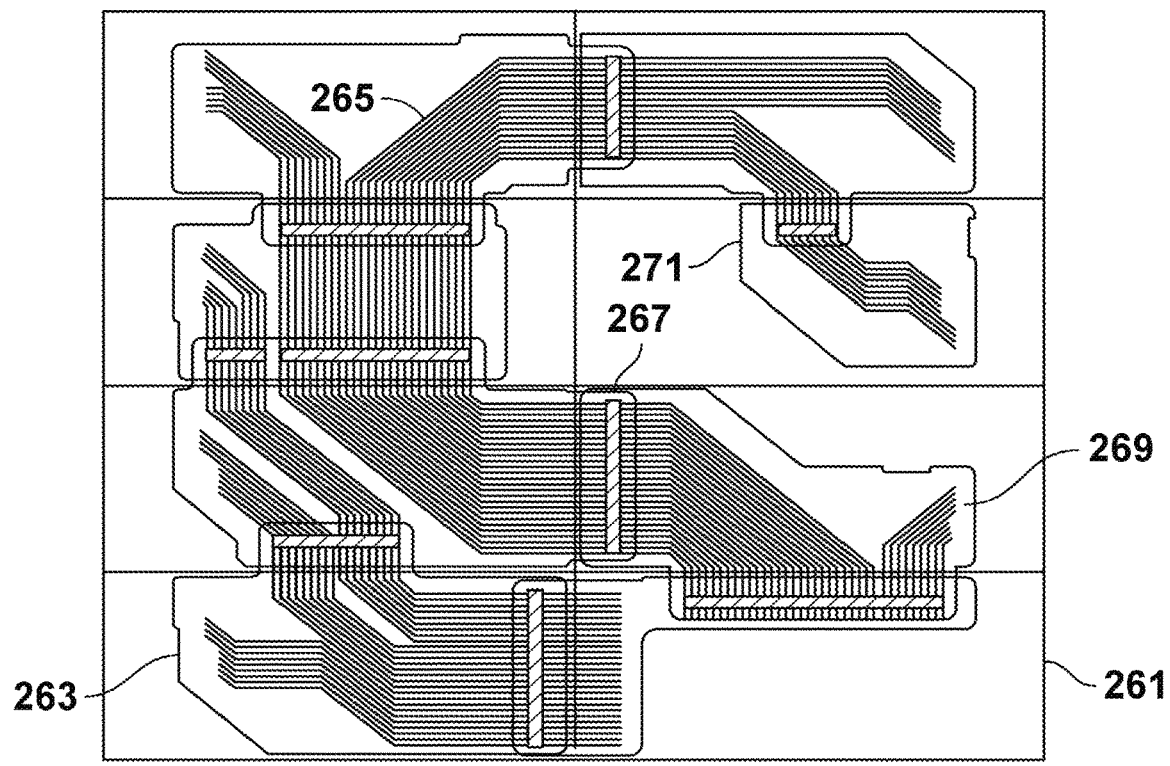
FIG. 5 is a plan view of a flexible circuit for a computing device in accordance with one embodiment of the invention.

A flexible circuit 263 for the computing device 109 is illustrated in FIG. 5. The flexible circuit 263 is made up of multiple sections which correspond to each segment of the touch screen display. In the embodiment illustrated, eight segments are shown. The processor and a majority of the electronics are housed in segment 261. Although the display drivers can be housed in other segments, it is best to also house them in segment 261 to retain the thinnest possible screen configuration, which is especially important when the touch screen display is folded into its compact state.

Traces 265 for the flexible circuit provide an electronic connection to the touch screen display of each segment. The touch-sensitive component of the display is preferably a capacitive touch screen. Other methods of touch screen can be used too, such one with a 4-wire analog sensor. The screen for each segment may include Liquid Crystal Displays (LCD), which can be as thin a little over a millimeter, or they may also be made up of Organic Light Emitting Diodes (OLED) displays, which would also be advantageous because of their efficient use of power and thin assembly. The traces 265 can be seen ending at flexible circuit section 271. Each flexible circuit section shown in FIG. 5 ultimately provides an electronic connection to a display and a touch screen which uses an ultra-thin connector, such as a Molex SlimStack SMT, which can be as thin as 0.90 millimeters.

Figure 6:
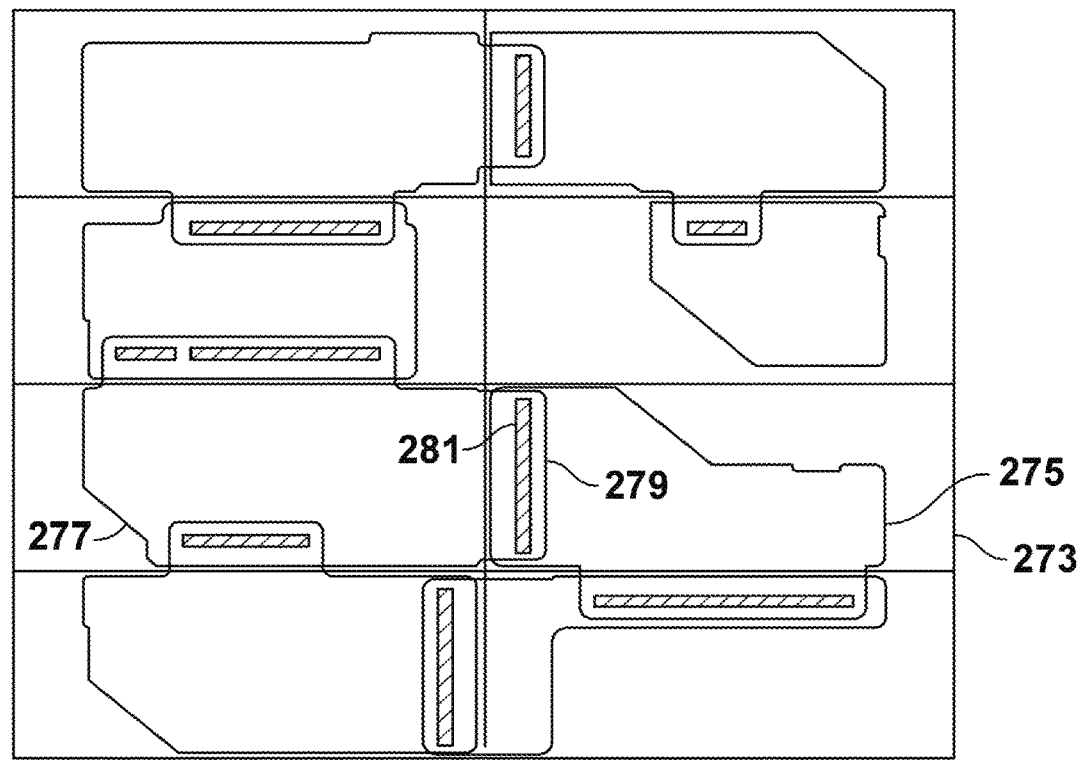
FIG. 6 is a plan view of the flexible circuit from FIG. 5 emphasizing the sections for each touch screen segment of one embodiment of the invention.
Figure 7:
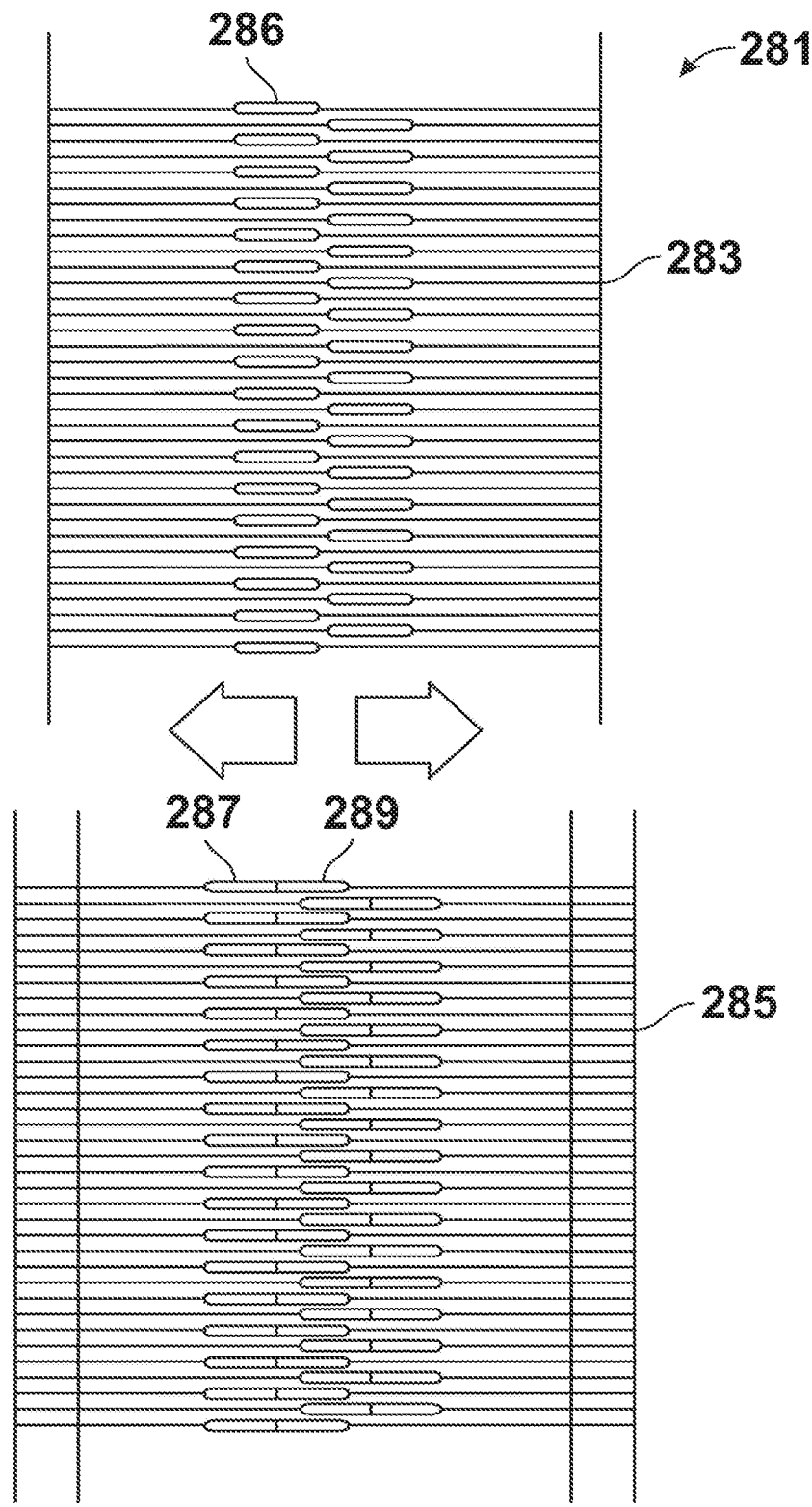
FIG. 7 is an enlarged view of a sliding connector from the flexible circuit illustrated in FIG. 5.

Additionally shown in FIG. 5 is a sliding connector 267. A sliding connector is also illustrated in the flexible circuit 273, which is shown without traces in FIG. 6 for clarity, whereby flexible circuit section 277 and flexible circuit section 275 overlap at connection 279. Sliding connector 281 can be seen enlarged in FIG. 7. This connection can first be seen in an initial state 283 where an overlapping connection 286 provides a link between two different flexible circuits section, which ultimately bridges between the joint of two touch screen display segments. A second state 285 is illustrated in FIG. 7 with connector 287 and connector 289 is shown moving in opposite directions from each other, while still providing a connection. As discussed earlier, having a sliding connector between each touch screen display segment joint allows the flexible circuit to remain in a position that, when folded, conforms to the displaced surface of the fold, whether it be between segments sets with one segment each or as many as three stacks of segments each.

Figure 8:
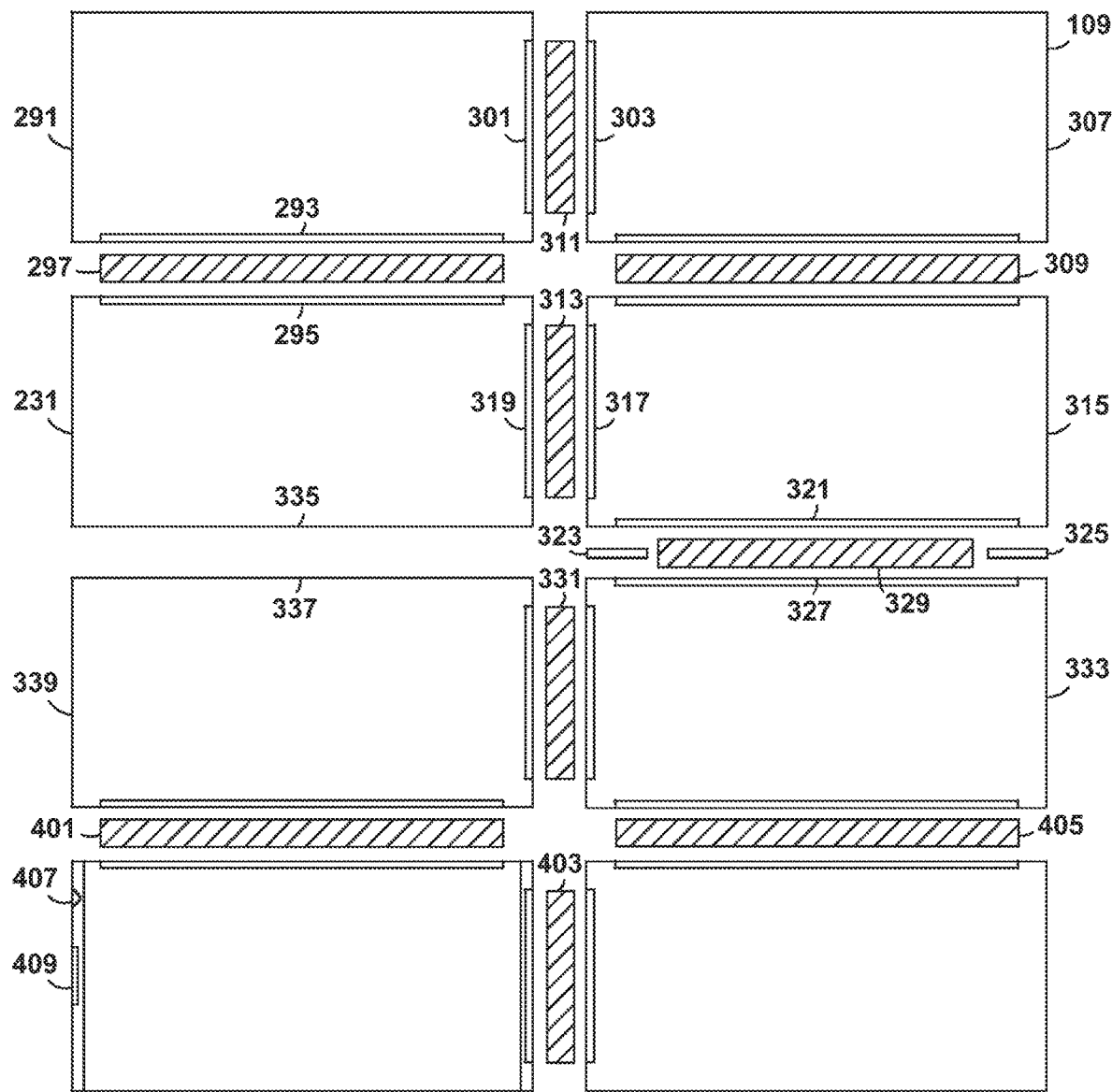
FIG. 8 is a plan view of the back panels, flexible circuit housing and mechanical features for one embodiment of a touch screen computing device.

FIG. 8 shows the back side of the basic structure for the reconfigurable touch screen computing device 109 in a partially exploded configuration. Preferably, each segment may have a rigid but light weight material for a backing, such as aluminum or titanium. In between each segment, a sleeve is shown which is used to house each flexible circuit. Preferably, each sleeve may also have elastic properties, so that it can stretched when a set of segments are reconfigured. These sleeves may not only provide a housing for the flexible circuits, but they may also act as an alignment feature and a mechanical connection between segments.

The number and location of hinges may be varied according to embodiments of the invention. For example, in the embodiment shown, although hinges 323 and 325 are used between segments 315 and 333 to provide a rigid folding connection between both halves of the entire touch screen display to provide the basic mechanical functionality of a laptop, other depicted segments do not include hinges, insofar as doing so may create additional material and thickness to the computing device 109 when it is in a fully folded, compact state.

Also shown in FIG. 8 is a series of channel openings along the edges of each segment. For segment 291, channel opening 301 engages with one side of sleeve 311, while channel opening 303 on panel 307 engages with the other side of sleeve 311. On the bottom edge of segment 291, a second channel opening 293 engages with one side of sleeve 297, while the channel opening 295 for segment 231 engages with the other side of sleeve 297. Additional sleeves 309, 329, 401 and 405 are situated along one axis, while additional sleeves 313, 331 and 403 may act to hold segments together along an axis perpendicular to the first axis. The computing module 409 is also shown in this plan view where peripheral ports 407 can also be seen. It is will be noted that in the depicted embodiment shows, as in the embodiment of FIG. 1, there may be a break between segments 335 and 337.

Figure 9:
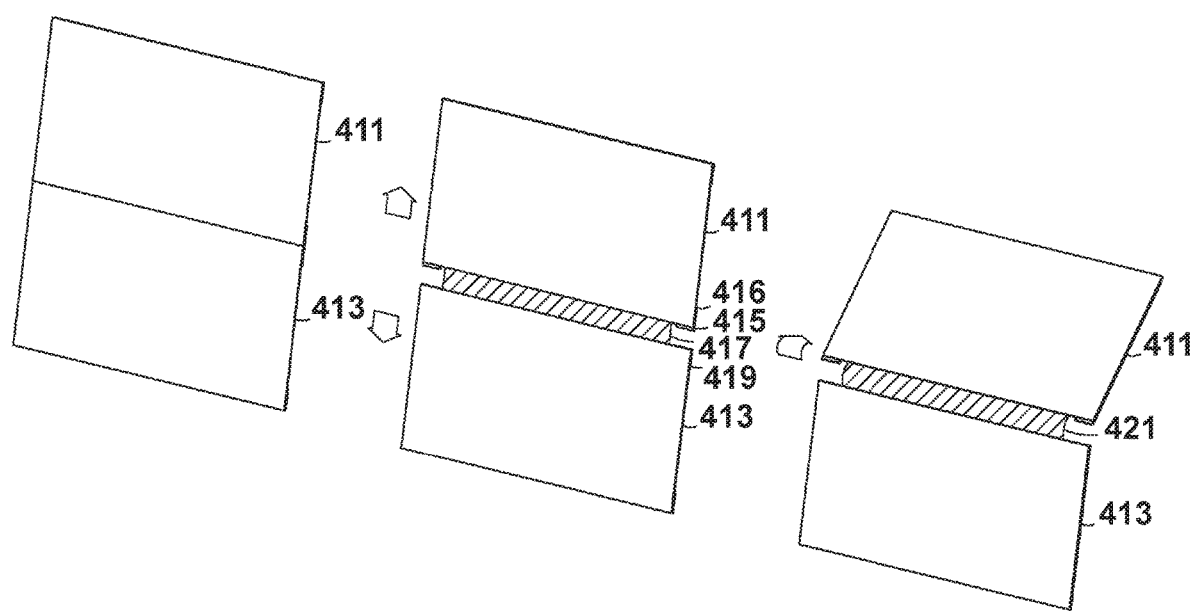
FIG. 9 is a diagram of a folding sequence of two touch screen display panels being reconfigured in accordance with the present invention.

Referring to FIG. 9, a simple diagram of a folding sequence of two touch screen display segments being reconfigured is shown with three positions. Segments 411 and 413 are shown in a first position at the left side of sequence in a locked functional position which allows both segments to display a combined area of content when in a locked state. In the second position of the sequence, segments 411 and 413 are shown in a separated position. An elastic sleeve 417 is situated between segments 411 and 413 to provide a housing for the flexible circuit connecting the segments. A magnet 415 is situated along the edge and back side of segment 411 which provides a lock for both segments when connected to a second magnet 419, which is situated along the edge and back side of segment 413, allowing two segments to snap together without extra bulky hardware, such as mechanical hinges. Adjacent to magnets 415 and 419 are sensors 416 which determine whether or not segments 411 and 413 are connected, which ultimately communicates to the processor if the screen should be on or off. In the third position seen at the right side of the sequence, segments 411 and 413 are shown being further separated and rotated down so that it can eventually be repositioned where the back sides of each segments are tangent with each other. The elastic sleeve 417 in position three is also further separated to conform to displacement needed for both panels to separated and then reconfigured.

Figure 10:
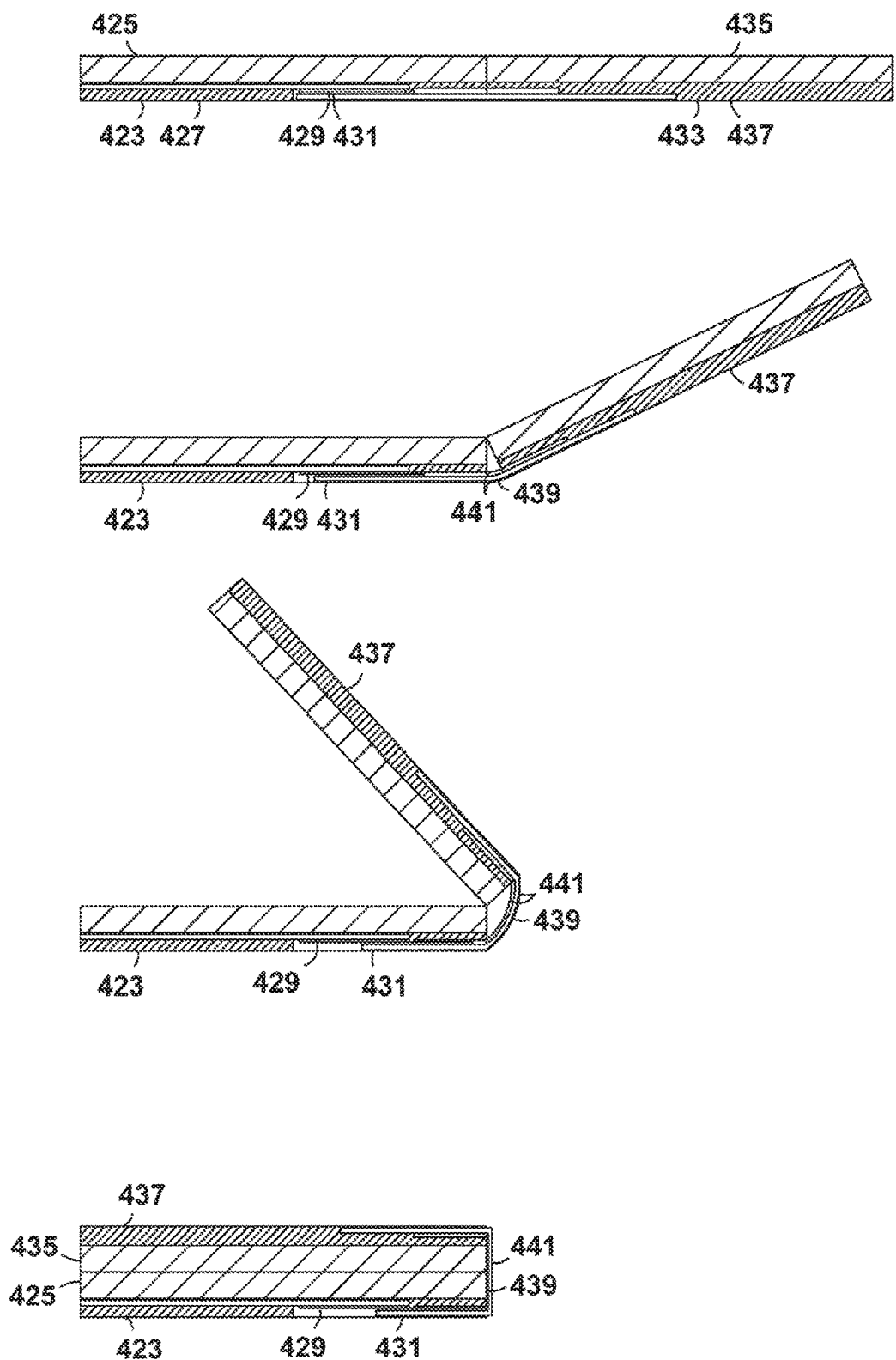
FIG. 10 is a sectional diagram of a folding sequence for two touch screen display panels in accordance with the invention.

The folding and repositioning of two segments can also be seen in a sectional view in FIG. 10. It is useful to view embodiment shown in FIG. 10 in conjunction with FIGS. 5-9. Segments 423 and 437 are shown in a folding sequence with four positions. In the first position, segments 423 and 437 have a first screen 425 and a second screen 435 with a first backing 427 and a second backing 433. The first backing 427 has a channel where a first sliding connector 429 is fixed to the first backing 427. A second sliding connector 431 is fixed to the second backing 433. In the second position of the folding sequence, segment 437 is shown rotating towards a secondary position around segment 423. Because of the displacement caused by this rotation, the first sliding connector 429 and the second sliding connector end up in a new displaced position while still connected. The elastic sleeve 441 may house the flexible circuit 439, which is ultimately stretched to conform to each new position in the sequence between segments 423 and 427.

In the third of the sequence shown in FIG. 10, the first sliding connector 429 and the second sliding connector 431 become further displaced while still remaining connected. In the fourth position of the sequence, segments 423 and 437 are shown in a fully folded state whereby the faces of the first screen 425 and the second screen 435 are sitting tangent and flat against each other with the elastic sleeve 441, flexible circuit 439, and the first sliding connector 429 and second sliding connector are all in a new displaced, but compact position.

It will be noted that although the depiction shown in FIGS. 9 and 10 show only two segments, this same structure can be applied to any or all edges of some or all segments that have a connection between each other. It will further be noted that as an alternative to having sliding connections, connections may also be permanently fixed with additional slack on each flexible circuit portion that sits between segments, so that it can conform from the geometry of one folded state position to another. As another alternative, a stretchable circuit may also be used between touch screen display segments.

Referring to FIG. 11, computing device 100 is shown folding from a tablet state to a phone state in a sequence with five positions. This same folding pattern can also be seen in FIG. 1*a*, where computing device 100 is shown in a perspective view to emphasize its folding pattern. FIG. 11 is shown with a side view and emphasizes frame hinge 114 which is connected between the frames of segment 101 and segment 103. Segment 107 and segment 105 are located on the other side of segments 103 and 101, but are rotated to a position tangent to segments 103 and 101, which can be seen in the second position from the top. In this same second position, segment set 107 and 103 can be pulled away by a user from segment set 101 and 105 through slots located on both ends of frame hinge 114, which are attached to pins inside of the frame edges of segments 101 and 103. In the third position and fourth position from the top of the folding sequence shown in FIG. 11, the rotation of segment set 107 and 103 along a pivot axis located where frame hinge 114 is attached to segment 101, allows computing device 100 to then reconfigure to the phone state position illustrated in the final position at the bottom of the sequence. Because of the slots and length of frame hinge 114, segments 103 and 107 can ultimately be offset from segment 101 and guided in such a way that segment 105 does not interfere with the folding sequence and ends up positioning segment 103 so that it is tangent with the underside face of segment 105 in the final position. For extra stability, a second hinge that is parallel with frame hinge 114 could also be integrated on the other side of segments 103 and 101, so that it is situated at the center of computing device 100 when it is in a tablet state configuration, which would then end up along its edge when it is in a phone state configuration.

Figure 12:
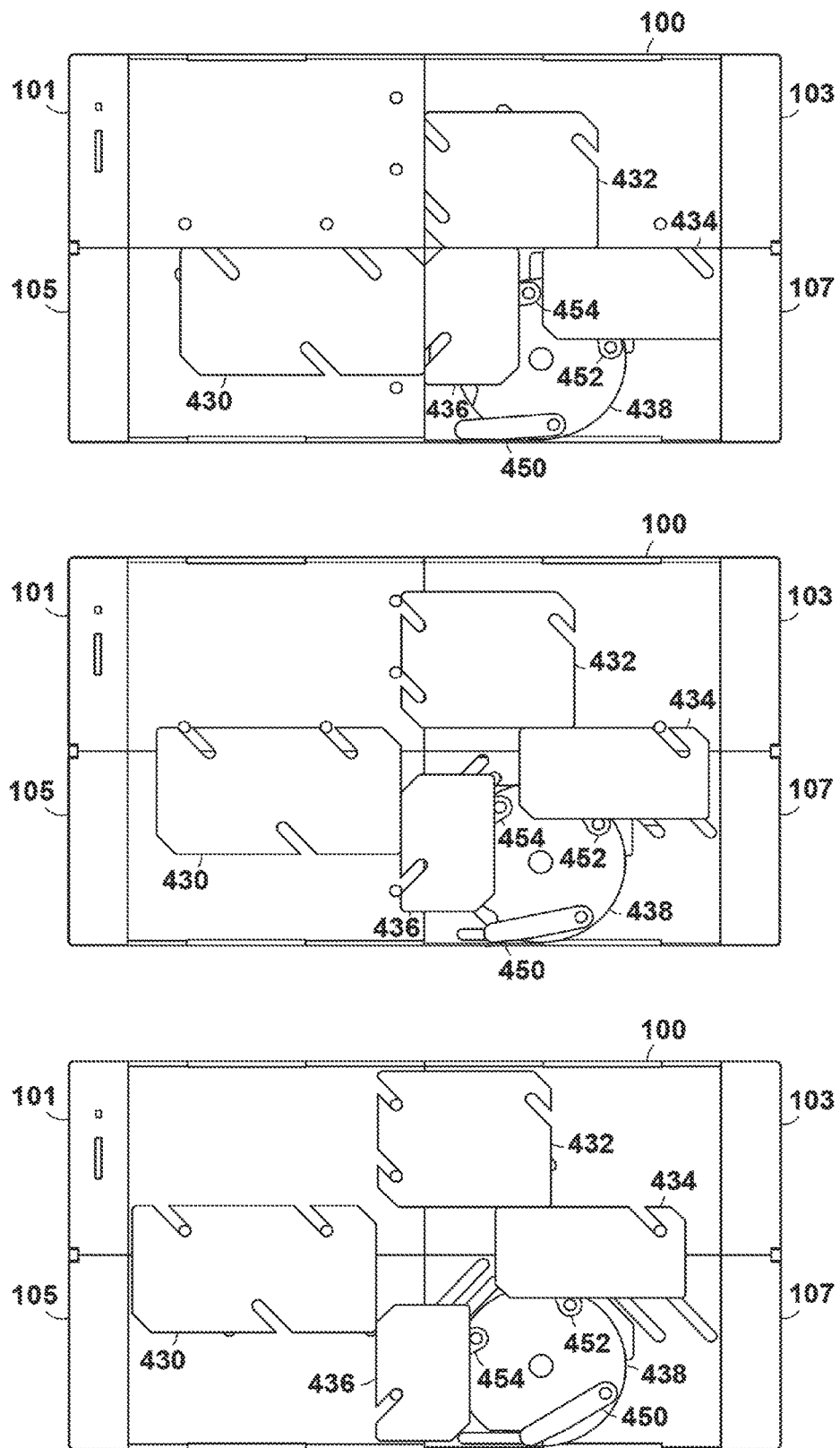
FIG. 12 is a diagram of an alignment locking mechanism in accordance with one embodiment of the invention.

In FIG. 12, an alignment locking mechanism is illustrated in a sequence with three different positions. In the full assembly of computing device 100, touch screen displays may sit above each of the segments, but they are not shown in the diagram to better illustrate this particular embodiment of an alignment locking mechanism which is situated below each of the screens with a thin housing. The first position at the top of the page shows computing device 100 and segments 101, 103, 105, and 107 in an unlocked position. Alignment plate 430 is shown at rest in an initial state located within a housing that sits within segment 105. Alignment plate 432 can also be seen at rest in the first within segment 103. Alignment plates 436 and 434 are initially housed within segment 107 in the first position. A larger frame component can be seen along the left and right side of computing device 100, similar to what is shown in FIG. 1*a*, whereby a speaker is located in the upper left corner for segment 101. Because of the larger size of this frame, additional electronics, including extra sensors, a keypad, and even batteries could be integrated in such a way that they would not interfere or add extra thickness to the device where the alignment mechanism is located. To continue with the description of the diagram from FIG. 12, the second position shows alignment plates 430, 432, 434, and 436 being actuated by the rotation of disc 438. This disc is driven manually by a user from the outside edge of segment 107 by a small switch that is attached to link 450 which can be moved along a linear track. As disc 438 rotates, link 452 forces alignment plate 434 into segment 103. Because alignment plate 434 is tangent with alignment plate 432, the force from one plate is translated to the other plate, allowing alignment plate 432 to move from segment 103 to segment 101. Similarly, alignment plate 436 is illustrated moving from segment 107 to 105 and is actuated by link 454, which is also driven by disc 438 and link 450. The force from alignment plate 436 is also translated over to alignment plate 430 which moves from segment 105 to segment 101. In the third position of the diagram shown at the bottom of FIG. 12, the final locking position is illustrated with all four alignment plates each lock two segments together. Alignment plate 430 connects and locks segment 105 and 101, while alignment plate 432 connects and locks segments 103 and 101. Alignment plate 434 also connects segments 107 and 103, while alignment plate 436 connects and locks segments 107 and 105. The alignment plates also have slots that can be seen engaging with pins on each of the segments that each alignment plate is being moved and connected to. Because of the force that needs to be repeatedly applied to the integrated touch screen component of the device, these alignment plates not only provide a connection and a means for locking the whole assembly together, but they also provide structural support between each segment as well. This alignment mechanism can also be applied to a flexible touch screen display version of the computing device, which will be further elaborated on with FIGS. 23 and 24.

Figure 13:
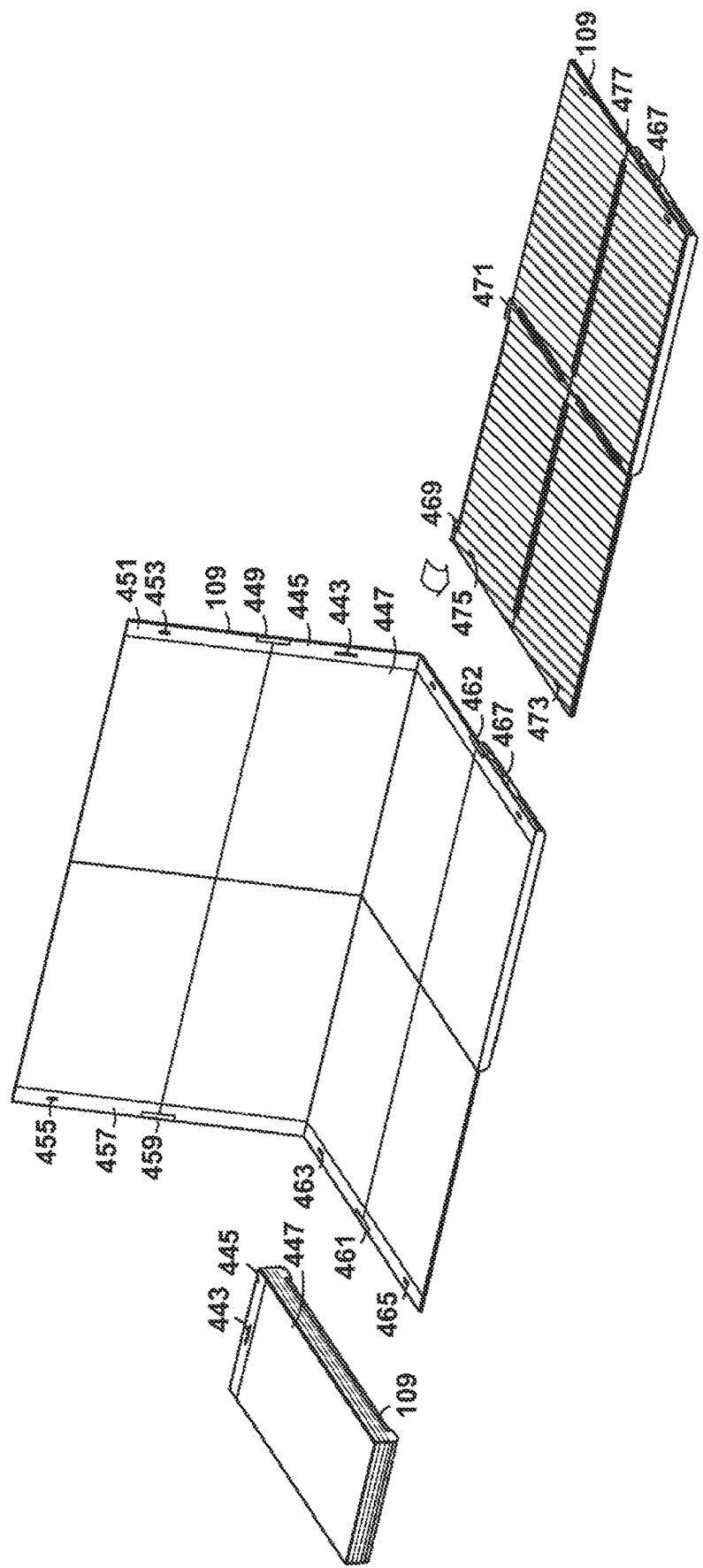
FIG. 13 is a view of a touch screen computing device shown in different states with a support structure having magnets, sensors and hinges along one folding axis.

FIG. 13 illustrates the computing device 109 in three states. The first state shows the computing device 109 in a compact phone state, the second state shows the computing device 109 in a laptop position, and the third state shows the computing device 109 in a closed laptop state. Hinges 469 and 471 are located at the back side of the computing device 109 in state three such that the top four segments can be folded down. When the laptop state is closed, a set of sensors 455 and 465 that lie on a support structure 457 located along the edges of the screen segments, will indicate to the processor and a software component that the screen should be shut down when they are connected. Alternatively, when sensors 455 and 453 are connected, this will indicate that the computing device is configured in a compact state. Additional sensors 473 and 475 which are located on the back side of the laptop state configuration, seen in the third state, can also be connected to indicate that the computing device is in a compact state. This can also be seen in FIG. 14 where the second position shows the first folded position which will ultimately connect sensors 473 and 475 from the back side of the screen configuration with each other. It is important to note that a variety of different types of sensors may also be used for the disclosed invention, including but not limited to optical sensors, force sensing resistors (FSRs), magnetic sensors and so on.

Figure 14:
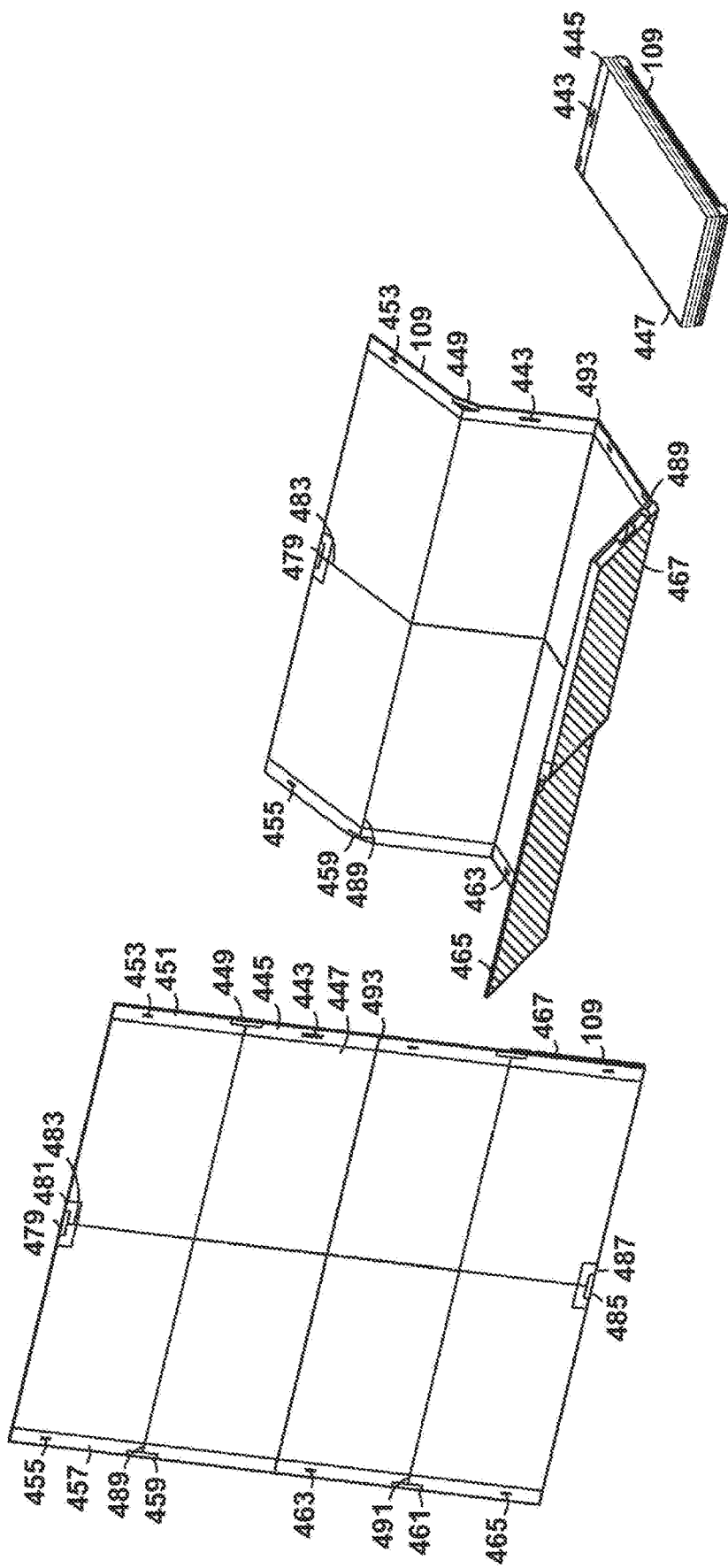
FIG. 14 is a view of a touch screen computing device shown in different states with a support structure having magnets, sensors, and hinges along multiple folding axes.

Additional support hinges 459, 449, 461 and 462 are included with the embodiments from FIGS. 13 and 14. The second state shown in FIG. 14 shows hinges 459 and 449 supporting the fold seen in the upper four segments of that transitional folding position. A second set of hinges 479 and 485 are also located between the upper and lower two segments along the central axis of the entire touch screen display. A fixed speaker 443 is shown in the first compact state of FIG. 13 along support structure 445, and again in the second state from FIG. 13. Having the speaker 443 in this location provides a logical position for it in both the compact state and closed state. The same speaker can be seen with computing device 109 in all three states from FIG. 14.

Figure 15:
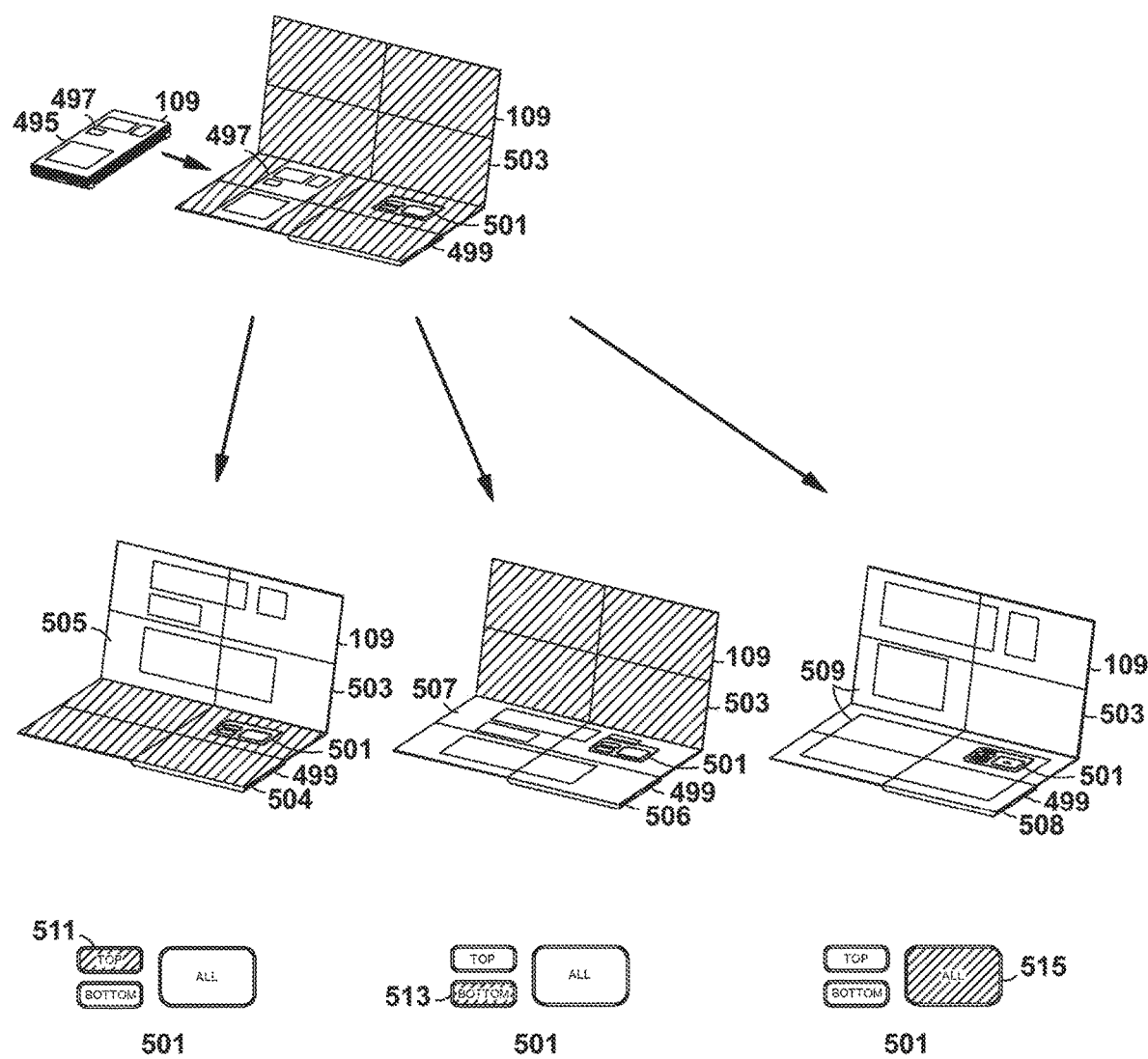
FIG. 15 is a diagram showing the transition of content on a reconfigurable touch screen display from a compact screen state to an expanded screen state through a graphical user interface.

FIG. 15 illustrates a graphical user interface whereby a set of virtual buttons 501 are used to rescale content from when the computing device 109 is in a compact state 495, to an expanded state 502. The content 497 shown in the screen display of the compact state 495, first transitions to the expanded state 502 in the area that is made up by the lower segments 499, while the upper half can remain blank. The content can then be seen in three separate states in FIG. 15 where it is rescaled based upon which of the virtual buttons 501 has been indicated. The first content transition 504 shows the original content 497 rescaled to the upper segments 503 of the computing device 109. The second content transition 506 shows the content 497 rescaled to the lower segments 499, and the third content transition 506 shows the content 497 rescaled to the entire combined screen area of the upper segments 503 and the lower segments 508.

Figure 16:
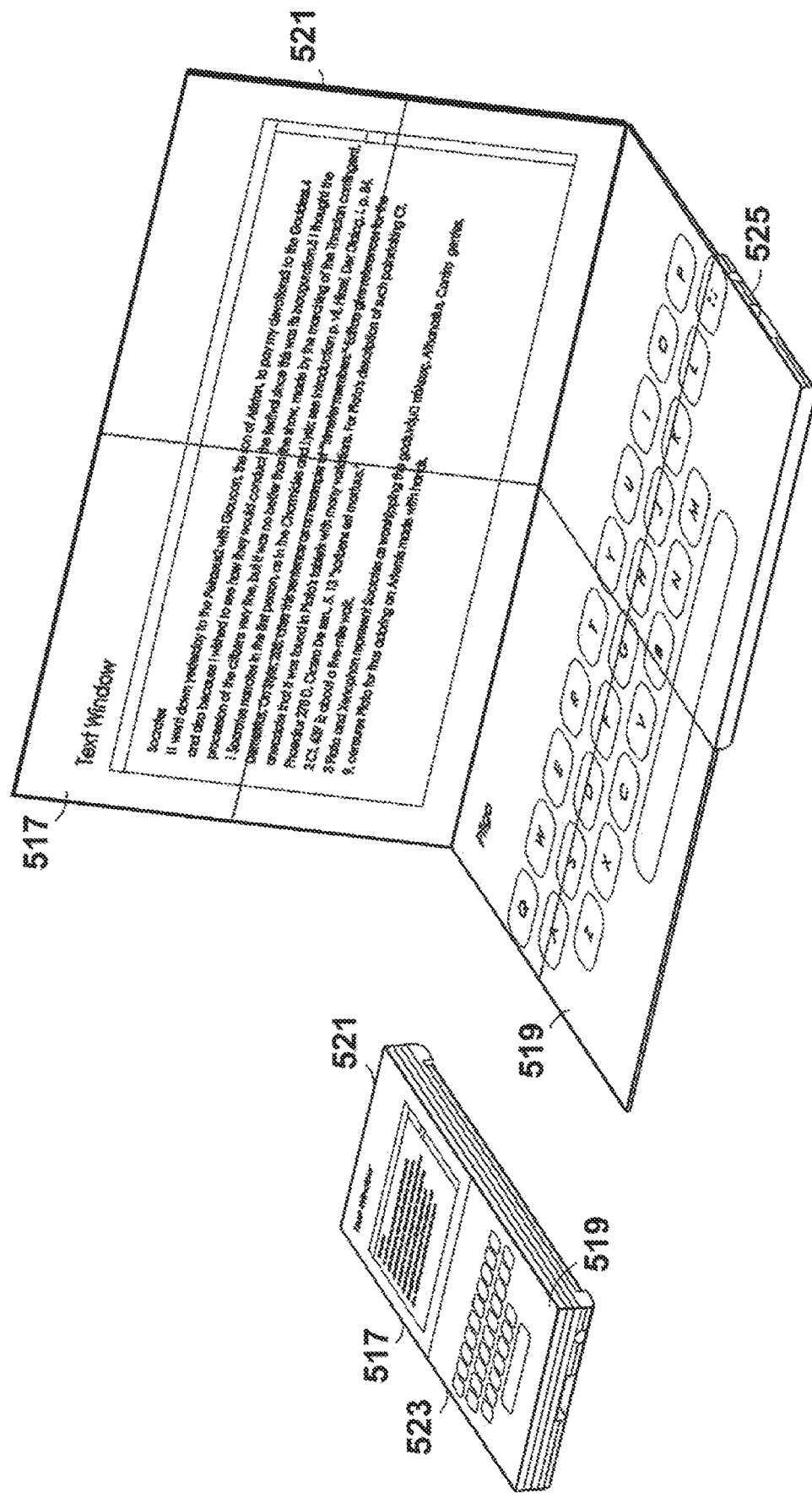
FIG. 16 is a view of one embodiment of a computing device showing the transition of two areas of content from a compact screen state to an expanded screen state.
Figure 17:
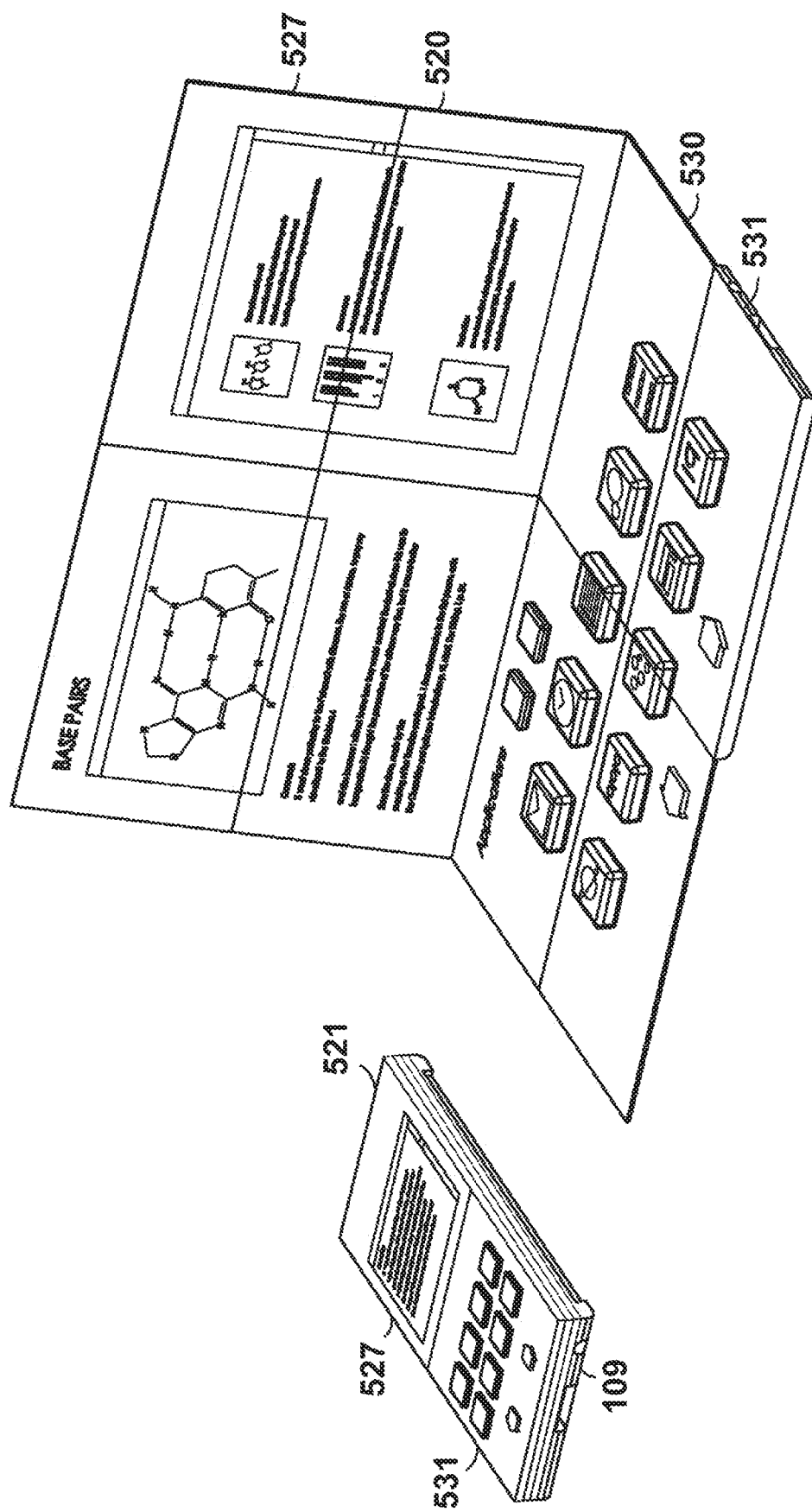
FIG. 17 is a view of one embodiment of a computing device showing the transition of two areas of content from a compact screen state to an expanded screen state.
Figure 18:
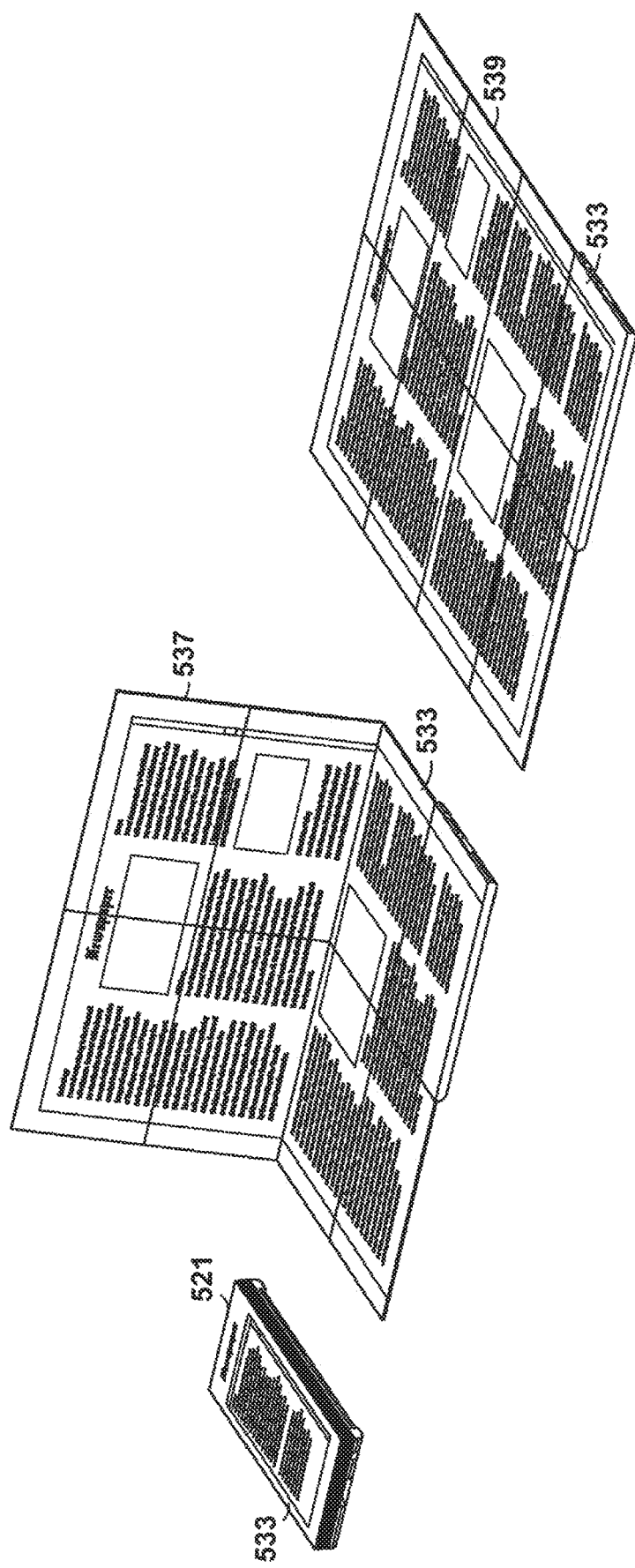
FIG. 18 is a view of one embodiment of a computing device showing the transition of one area of content from a compact screen state to an expanded screen state.

The flowchart from FIG. 4 can be better appreciated when referring to FIG. 16-18 because of the correlation to how content is transitioned from one state to another. In FIG. 16, the computing device 109 shows an upper area of content with a text window 517 and a lower area of content with a virtual keyboard 519 on the compact state 521 and its touch screen display 523. When the computing device is opened to a laptop state 530, the text window 517 is rescaled to the upper segments 520, while the virtual keyboard 519 is rescaled to the lower segments 525 of the laptop state 520. The lower segments where virtual keyboard 519 is displayed may alternatively be the location of a physical keyboard which would also be configured with a similar size and layout to virtual keyboard 519.

Similarly, in FIG. 17 two areas of content are rescaled from the computing device 109 when it is in a compact state 521. The upper area of content shows a browser window 527 which is rescaled to the upper segments 520 of the laptop state 530, while the lower area of content, which shows an applications window 531, is rescaled to the lower segments 531 of the laptop state.

In FIG. 18, a content area shows a newspaper 533 on the touch screen display of the computing device 109 while it is in a compact state 521. When the computing device 109 is rescaled to the laptop state 537, the newspaper 533 content is automatically rescaled to the entire display. A third state is also shown in FIG. 18 showing how the device can be flattened into a tablet, which would be most convenient for this particular scenario.

Figure 19:
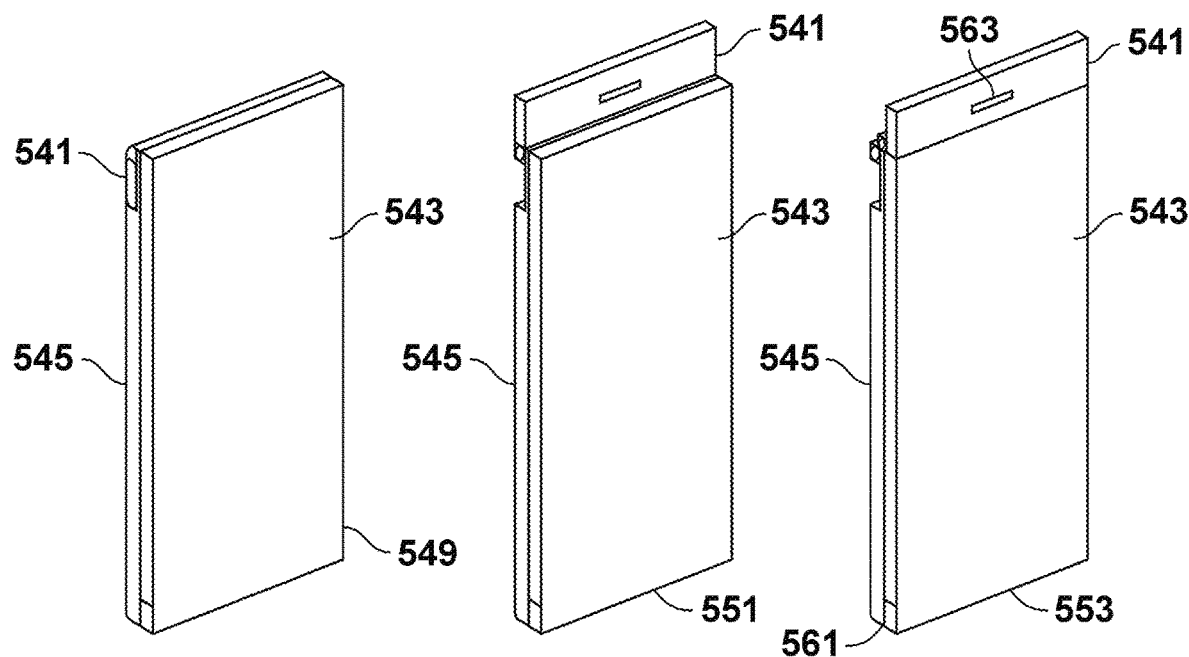
FIG. 19 is a perspective view of a diagram for a computing device in a compact state showing a folding sequence for a speaker.
Figure 20:
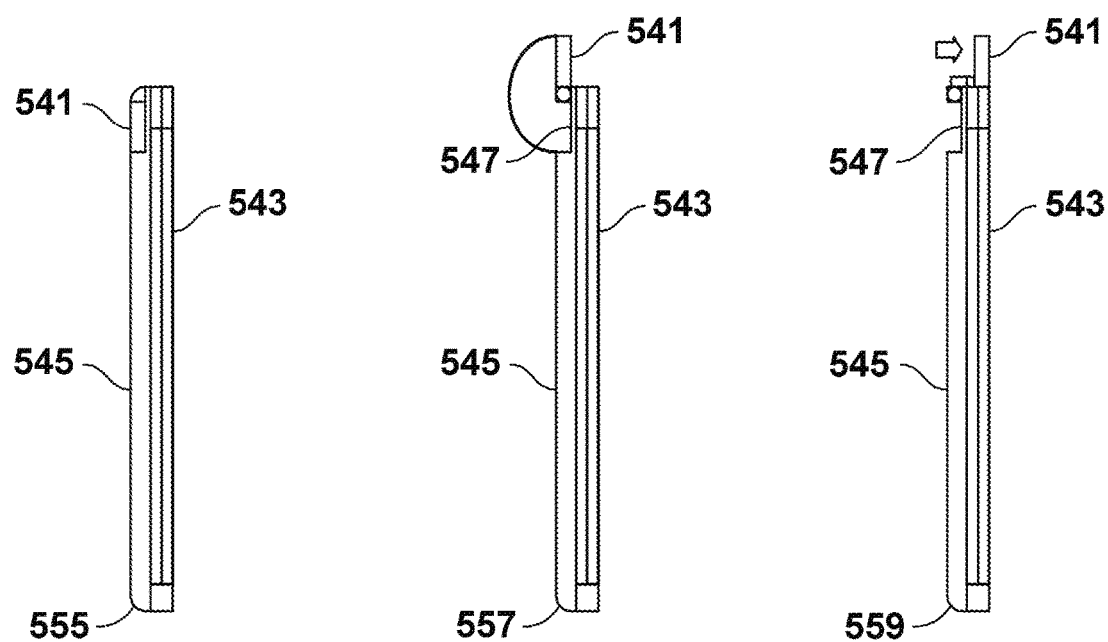
FIG. 20 is a side view of a diagram for a computing device in a compact state showing a folding sequence for a speaker.

Referring to FIG. 19, the reconfigurable touch screen computing device is shown in a compact state, where a speaker module 541 is rotated from the computing module 545 in the first position 549, to the front side in a second position 551 where a folded touch screen 543 is located. A third position shows how the speaker module 541 can slide forward past the folded touch screen 543 to a third position 553 where it shares the same datum as the first touch screen display segment of the folded touch screen 543. This mechanical rotation ultimately allows a screen to be viewed without any additional hardware for a speaker that might normally take away from the scale of a touch screen display that is being used as a phone. When the speaker module 541 is fully rotated to the third position, an integrated sensor or switch can be activated which will ultimately answer an incoming phone call. FIG. 19 can be better understood when viewed in conjunction with FIG. 20, which shows three side views 555, 557, and 559, of the same rotation of the speaker module 541. A channel 547 is also shown in FIG. 20 to illustrate where the speaker module is rotating out from. A microphone 561 is also integrated at the bottom of computing module 545.

Figure 21:
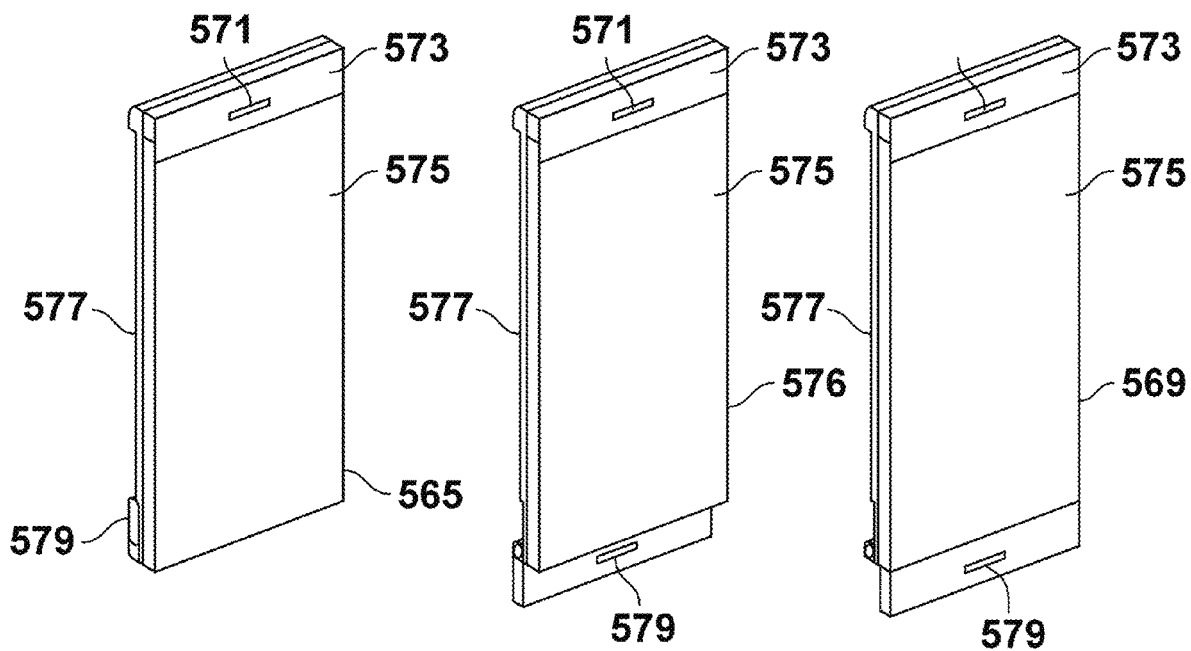
FIG. 21 is a perspective view of a diagram for a computing device in a compact state showing a folding sequence for a microphone.
Figure 22:
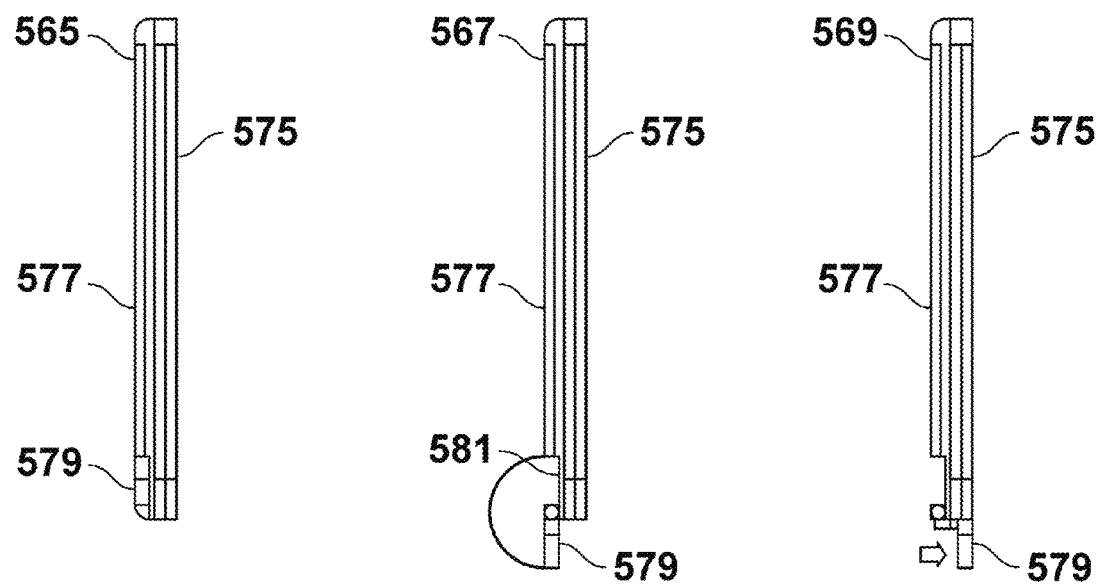
FIG. 22 is a side view of a diagram for a computing device in a compact state showing a folding sequence for a microphone.

FIG. 21 shows a similar diagram as FIG. 19 with three positions of a reconfigurable touch screen computing device shown in a phone state. It is important to note that this particular computing device, along with the one shown in FIGS. 19 and 20, could be made up of a folded segmented touch screen, flexible screen, or just a single screen on its own. In the first position 545 of FIG. 21, speaker 571 is located along frame 573 at the top of segment 575, which also includes a touch screen display. A microphone module 579 can be rotated forward from computing module 577, as illustrated in the second position 567, before being slid forward in such a way that it shares the same front face surface of the computing device, which can be seen in position 569. This same transitional diagram can also be seen with a side view in FIG. 22, which also illustrates how microphone module 579 is rotated out from channel 581 located at the lower end of computing module 577. Although microphone module 579 has been defined with fixed speaker 575 at the top of this particular embodiment, both of these components can be reversed, where the speaker is located as part of the rotatable module at the bottom and the microphone is fixed at the top of segment 575.

Figure 23:
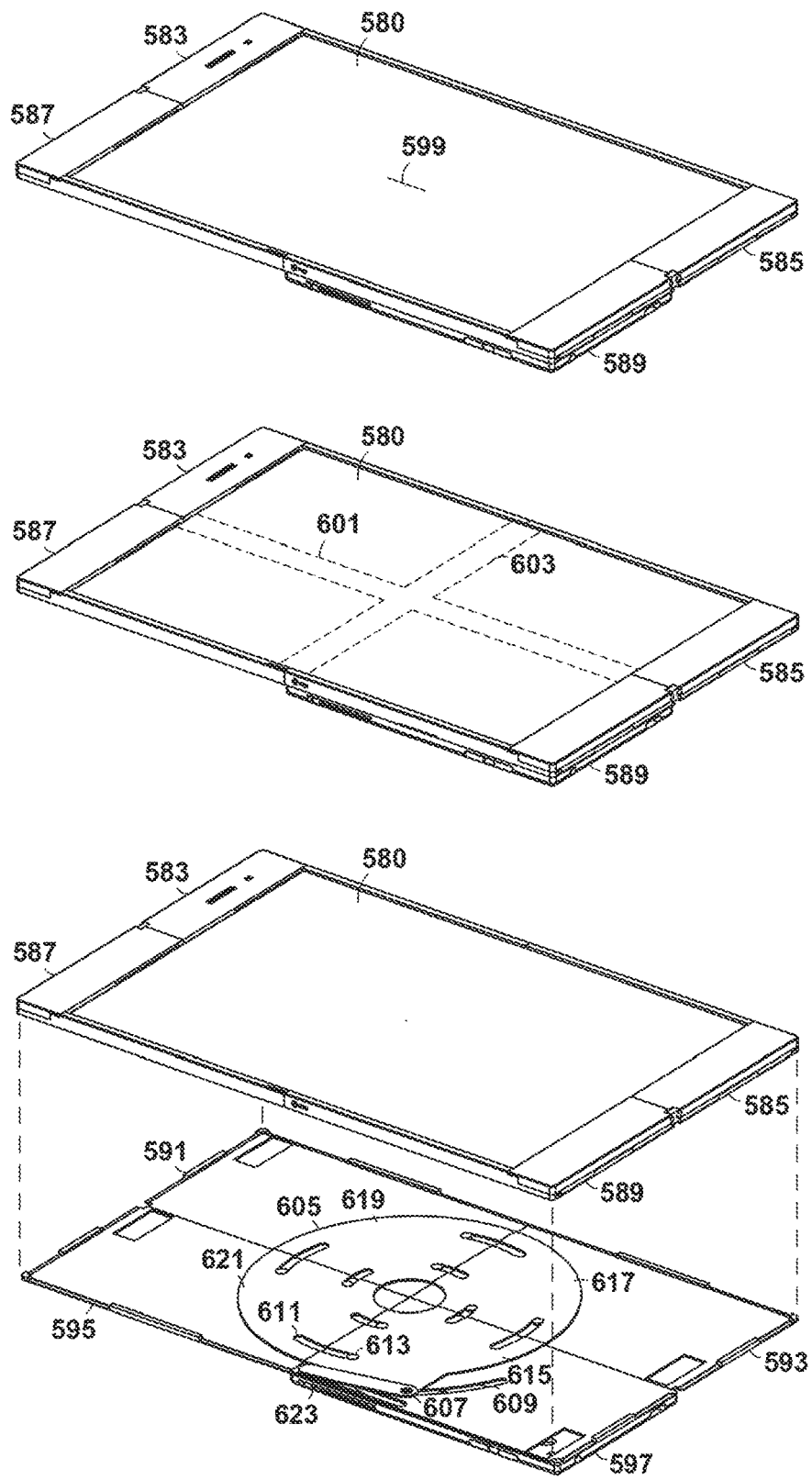
FIG. 23 is a perspective view of one embodiment of a computing device with a flexible screen shown in three different diagrams.

A reconfigurable computing device with a flexible screen is illustrated in FIG. 23. This particular embodiment is similar to computing device 100 shown in FIG. 1 because it integrates four segments as structural supports with an alignment mechanism, but uses a flexible screen instead. This flexible screen 580 can be seen in an open tablet state in three different diagrams which illustrate different features of the computing device. Flexible screen 580 also sits within segments 583, 585, 587, and 589. In the diagram at the top of FIG. 23, slit 599 is illustrated in the location of where a kink or a crease might occur due to the double fold that this particular computing device embodiment needs to be folded with in order to be fully reconfigured to a phone state. Having slit 599 with a length of about a half an inch running either left to right or top to bottom, will prevent a kink or crease from forming. The folding areas can be seen in the second diagram from the top where fold area 601, shown running from left to right, represents where the first fold is made, while fold area 603, running from top to bottom, represents where the second fold is made. These fold areas also represent where a radius occurs when the computing device is fully folded into a phone state. In the third diagram at the bottom of FIG. 23, an exploded image of the computing device is shown with flexible screen 580 and segments 583, 585, 587, and 589 representing the top assembly, while lower segments 591, 593, 595, and 597, with segmented disc plate 605 make up the bottom half assembly.

Similar to the alignment mechanism illustrated in FIG. 12, disc plate 605 from FIG. 23 is also an alignment locking mechanism made up of four sections which each correspond to a particular segment of the computing device where they are also housed. Each section of disc plate 605 can also be rotated in such a way that it connects and locks each of the segments together. To lock the device in a tablet state, link 607 is driven and accessed by a user from the outside edge of segment 596 in order. This is achieved when a small switch 619 attached to the outside edge of link 607 is moved along a linear slot, while the inside edge of link 607, which is connected to section 615 of disc plate 605, moves along a curved slot 609 which ultimately translates the users input force to the rotational motion of disc plate 605. The rotational motion of disc plate 605 is held in place by a plurality of slots integrated with each section of disc plate 605 that engage with pins located on lower segments 591, 593, 595, and 597. One example of this is where pin 613, which is located on the inside surface of segment 597, engages with slot 611 which runs between disc plate section 621, which is initially positioned above segments 595, and disc plate section 615, which is positioned above segment 597. As disc plate 605 rotates, slot 611 will slide along pin 613 until disc plate section 621 is repositioned to the point where it connects and locks segments 595 and 597 together. This same mechanism is used for each section of disc plate 605, whereby disc plate section 615 connects and locks segments 597 and 593, which also forces disc plate section 617 into a position that connects and locks segments 593 and 591. This same rotation also simultaneously forces disc plate section 619 to connect and lock segments 591 and 595 together. To unlock the tablet state, a user can slide switch 623 back to the original position shown in the exploded diagram of FIG. 23. Because disc plate 605 is made up of sections that conform to the rectangular geometry of each segment, the computing device is free to be folded along the central axis from top to bottom and from left to right when it is in the unlocked position. It is important to note that this same alignment locking mechanism may also be applied to a computing device that includes four touch screen display segments, like the embodiment shown in FIG. 1a, rather than having just a single flexible touch screen display.

Figure 24:
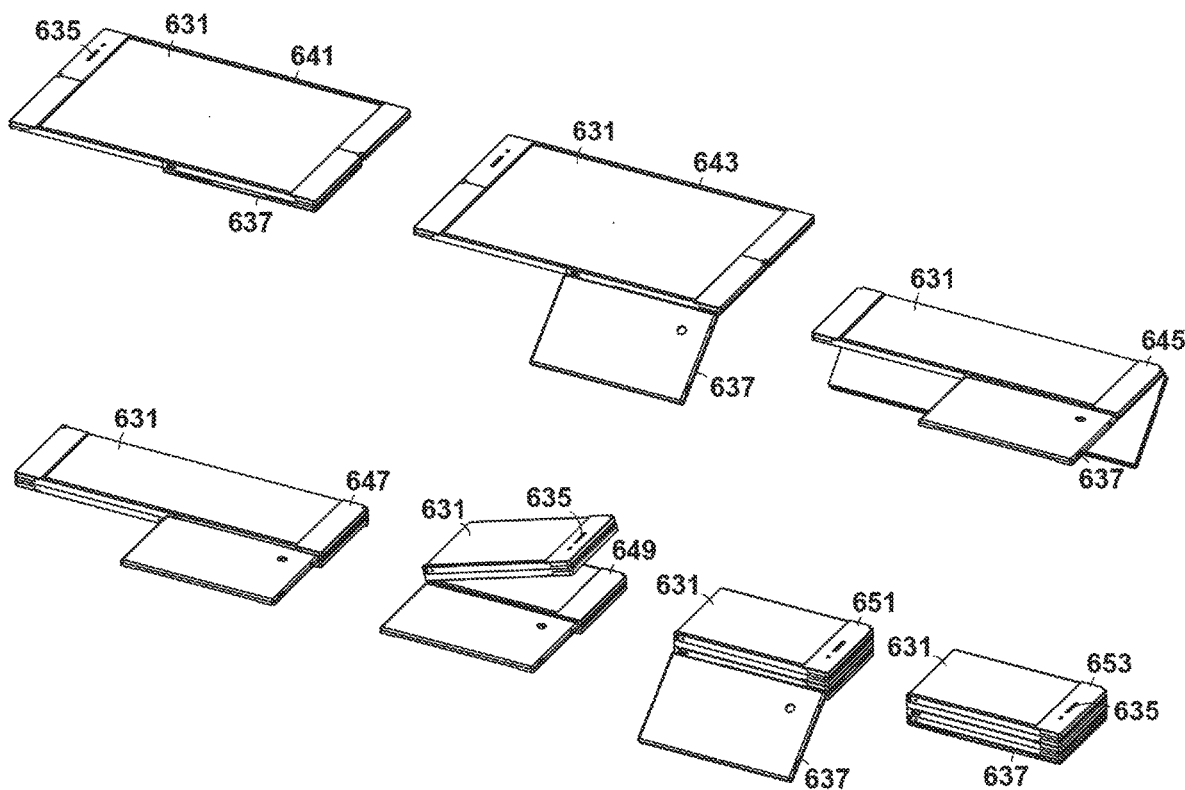
FIG. 24 is a diagram of a folding sequence for one embodiment of a computing with a flexible screen.

FIG. 24 elaborates on the folding pattern needed to reconfigure the same computing device shown in FIG. 23 from a tablet state to a phone state. The folding sequence consists of seven different positions. Each position shows the frame for the computing device reconfiguring with an attached flexible screen 631. A folded screen housing 637 is also illustrated throughout the folding sequence where it is shown with frame position 641 in a closed state where it sits at the bottom of the computing device. In frame position 643, folded screen housing 637 is shown folding out along a hinge on the edge of the computing device and then fully folded up with frame position 645. Folded screen housing 637 remains in this same position for frame positions 647, 649, and 651 so that it does not interfere with the folding pattern of flexible screen 631. For frame position 653, however, folded screen housing 637 is folded back to its original position, as seen with frame position 651 and 653, to house the fully folded flexible screen so that the computing device can then be implemented as a phone. The folding pattern itself is very simple and essentially consists of two folds. The first fold is along the center axis running from the right side to the left side, which can be seen with frame position 645, whereby half of flexible screen 631 is folded downward so that its back side is tangent with the back side of the other half. Once flexible screen 631 is fully folded in frame position 647, it may then be folded further along the center axis that runs from the top to the bottom of flexible screen 631, as seen with frame position 649. Frame positions 621 and 623 then show how speaker 635 ends up in an optimal position for when the computing device is used as a phone.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
a foldable touch screen display comprising a plurality of touch-sensitive flexible display segments, including a first flexible display segment configured with at least one magnetic component, and a second flexible display segment configured with at least one magnetic component, said first flexible display segment and said second flexible display segment having a folded state and an unfolded state; and
at least one touch-sensitive interface for generating a set of instructions, said touch-sensitive interface having a first set of instructions, a second set of instructions, a third set of instructions, and a fourth set of instructions;
a processor to:
obtain an image to be displayed, and display the image based on the set of instructions of the touch-sensitive interface, wherein
when the first set of instructions is generated, the processor is to display the image substantially on the first flexible display segment,
when the second set of instructions is generated, the processor is to remove the image from the first flexible display segment,
when the third set of instructions is generated, the process is to display the image substantially on the second flexible display segment, and
when the fourth set of instructions is generated, the process is to remove the image from the second flexible display segment.

2. The apparatus of claim 1, wherein said magnetic component configured with said first flexible display segment and said magnetic component configured with said second flexible display segment are mutually attracted to each other in the folded state.

3. The apparatus of claim 2, wherein said magnetic components are mutually attracted to each other in the folded state such that their respective flexible display segments are pulled together with their display faces configured to be facing each other.

4. The apparatus of claim 2, wherein said magnetic components are mutually attracted to each other in the folded state such that their respective flexible display segments are pulled together with their back sides configured to be facing each other.

5. The apparatus of claim 1, wherein said magnetic component configured with said first flexible display segment and said magnetic component configured with said second flexible display segment are mutually attracted to each other in the unfolded state.

6. The apparatus of claim 1, wherein said magnetic component configured with said first flexible display segment and said magnetic component configured with said second flexible display segment are each arranged proximate to the edges of their respective flexible display segments.

7. The apparatus of claim 1, wherein said first flexible display segment and said second flexible display segment each include an array of magnetic components.

8. The apparatus of claim 1, wherein at least one of said magnetic components is affixed to a spring-loaded push button allowing said magnetic components to be decoupled from each other when said spring-loaded push button is in a first position, and coupled to each other when said spring-loaded push button is in a second position.

9. The apparatus of claim 1, wherein at least one of said magnetic components is affixed to a sliding mechanism allowing said magnetic components to be decoupled from each other when said sliding mechanism is in a first position, and coupled to each other when said sliding mechanism is in a second position.

10. An apparatus comprising:
a foldable touch screen display comprising a plurality of touch-sensitive display segments, including at least one rigid component having at least one segment, at least one flexible component having a first segment configured with at least one magnetic component and a second segment configured with at least one magnetic component, said flexible component having a folded state and an unfolded state; and
at least one touch-sensitive interface for generating a set of instructions, said touch-sensitive interface having a first set of instructions, a second set of instructions, a third set of instructions, and a fourth set of instructions;
a processor to:
obtain an image to be displayed, and display the image based on the set of instructions of the touch-sensitive interface, wherein
when the first set of instructions is generated, the processor is to display the image substantially on the rigid display component,
when the second set of instructions is generated, the processor is to remove the image from the rigid display component,
when the third set of instructions is generated, the process is to display the image substantially on the flexible display component, and
when the fourth set of instructions is generated, the process is to remove the image from the flexible display component.

11. The apparatus of claim 10, wherein said magnetic component configured with said flexible component having a first segment and said magnetic component configured with said flexible component having a second segment are mutually attracted to each other in the folded state.

12. The apparatus of claim 11, wherein said magnetic components are mutually attracted to each other in the folded state such that their respective flexible component segments are pulled together with their display faces configured to be facing each other.

13. The apparatus of claim 11, wherein said magnetic components are mutually attracted to each other in the folded state such that their respective flexible component segments are pulled together with their back sides configured to be facing each other.

14. The apparatus of claim 10, wherein said magnetic component configured with said flexible component having a first segment and said magnetic component configured with said flexible component having a second segment are mutually attracted to each other in the unfolded state.

15. The apparatus of claim 10, wherein said magnetic component configured with said flexible component having a first segment and said magnetic component configured with said flexible component having a second segment are each arranged proximate to the edges of their respective flexible display segments.

16. The apparatus of claim 10, wherein said flexible component having a first segment and said flexible component having a second segment each include an array of magnetic components.

17. The apparatus of claim 10, wherein at least one of said magnetic components is affixed to a spring-loaded push button allowing said magnetic components to be decoupled from each other when said spring-loaded push button is in a first position, and coupled to each other when said spring-loaded push button is in a second position.

18. The apparatus of claim 10, wherein at least one of said magnetic components is affixed to a sliding mechanism allowing said magnetic components to be decoupled from each other when said sliding mechanism is in a first position, and coupled to each other when said sliding mechanism is in a second position.

19. The apparatus of claim 1, wherein said magnetic component configured with said first flexible display segment and said magnetic component configured with said second flexible display segment are mutually attracted to each other in the folded state.

20. The apparatus of claim 19, wherein said magnetic components are mutually attracted to each other in the folded state such that their respective flexible display segments are pulled together with their display faces configured to be facing each other.

21. The apparatus of claim 19, wherein said magnetic components are mutually attracted to each other in the folded state such that their respective flexible display segments are pulled together with their back sides configured to be facing each other.

22. The apparatus of claim 1, wherein said magnetic component configured with said first flexible display segment and said magnetic component configured with said second flexible display segment are mutually attracted to each other in the unfolded state.

23. The apparatus of claim 1, wherein said magnetic component configured with said first flexible display segment and said magnetic component configured with said second flexible display segment are each arranged proximate to the edges of their respective flexible display segments.

24. The apparatus of claim 1, wherein said first flexible display segment and said second flexible display segment each include an array of magnetic components.

25. The apparatus of claim 1, wherein at least one of said magnetic components is affixed to a spring-loaded push button allowing said magnetic components to be decoupled from each other when said spring-loaded push button is in a first position, and coupled to each other when said spring-loaded push button is in a second position.

26. The apparatus of claim 1, wherein at least one of said magnetic components is affixed to a sliding mechanism allowing said magnetic components to be decoupled from each other when said sliding mechanism is in a first position, and coupled to each other when said sliding mechanism is in a second position.

27. The apparatus of claim 10, wherein said magnetic component configured with said flexible component having a first segment and said magnetic component configured with said flexible component having a second segment are mutually attracted to each other in the folded state.

28. The apparatus of claim 27, wherein said magnetic components are mutually attracted to each other in the folded state such that their respective flexible component segments are pulled together with their display faces configured to be facing each other.

29. The apparatus of claim 27, wherein said magnetic components are mutually attracted to each other in the folded state such that their respective flexible component segments are pulled together with their back sides configured to be facing each other.

30. The apparatus of claim 10, wherein said magnetic component configured with said first flexible display segment and said magnetic component configured with said flexible component having a second segment are mutually attracted to each other in the unfolded state.

31. The apparatus of claim 10, wherein said magnetic component configured with said flexible component having a first segment and said magnetic component configured with said flexible component having a second segment are each arranged proximate to the edges of their respective flexible display segments.

32. The apparatus of claim 10, wherein said flexible component having a first segment and said flexible component having a second segment each include an array of magnetic components.

33. The apparatus of claim 10, wherein at least one of said magnetic components is affixed to a spring-loaded push button allowing said magnetic components to be decoupled from each other when said spring-loaded push button is in a first position, and coupled to each other when said spring-loaded push button is in a second position.

34. The apparatus of claim 10, wherein at least one of said magnetic components is affixed to a sliding mechanism allowing said magnetic components to be decoupled from each other when said sliding mechanism is in a first position, and coupled to each other when said sliding mechanism is in a second position.

35. A computing device comprising:
   a flexible touch screen display connected to a plurality of structural display segments wherein the flexible touch screen display has a folded state and an unfolded state; and
   at least one touch-sensitive interface for generating a set of instructions, said touch-sensitive interface having a first set of instructions, a second set of instructions, a third set of instructions, and a fourth set of instructions;
   a processor to:
      obtain an image to be displayed, and display the image based on the set of instructions of the touch-sensitive interface, wherein
      when the first set of instructions is generated, the processor is to display the image substantially on the rigid display component,
      when the second set of instructions is generated, the processor is to remove the image from the rigid display component,
      when the third set of instructions is generated, the process is to display the image substantially on the flexible display component, and
   when the fourth set of instructions is generated, the process is to remove the image from the flexible display component.

36. The computing device of claim 35, wherein the plurality of structural display segments are operatively connected to an alignment mechanism.

37. The computing device of claim 35, wherein the plurality of structural display segments are part of an alignment mechanism for establishing the folded state and the unfolded state of the flexible touch screen display.

* * * * *